United States Patent
Tsukamoto et al.

(10) Patent No.: US 8,676,472 B2
(45) Date of Patent: Mar. 18, 2014

(54) ATMOSPHERIC PRESSURE ESTIMATING APPARATUS

(75) Inventors: Toshinori Tsukamoto, Wako (JP); Naoki Oie, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 314 days.

(21) Appl. No.: 13/144,974

(22) PCT Filed: Jan. 14, 2010

(86) PCT No.: PCT/JP2010/050358
§ 371 (c)(1),
(2), (4) Date: Jul. 18, 2011

(87) PCT Pub. No.: WO2010/090060
PCT Pub. Date: Aug. 12, 2010

(65) Prior Publication Data
US 2011/0276254 A1  Nov. 10, 2011

(30) Foreign Application Priority Data
Feb. 6, 2009  (JP) .................................. 2009-026782

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC ....................................................... 701/103

(58) Field of Classification Search
USPC .......... 123/339.1, 339.14, 339.15, FOR. 112; 701/103; 73/114.32, 114.33
See application file for complete search history.

(56) References Cited

U.S. PATENT DOCUMENTS

| | | | | |
|---|---|---|---|---|
| 5,136,517 A | * | 8/1992 | Cullen et al. | 701/103 |
| 5,631,412 A | * | 5/1997 | Tomisawa | 73/114.32 |
| 6,016,460 A | | 1/2000 | Olin et al. | |
| 6,366,847 B1 | * | 4/2002 | Sun et al. | 701/103 |
| 6,430,515 B1 | * | 8/2002 | Sanyal et al. | 702/50 |
| 7,818,104 B2 | * | 10/2010 | Tahara et al. | 701/33.9 |
| 7,831,371 B2 | * | 11/2010 | Nishimura et al. | 701/103 |

(Continued)

FOREIGN PATENT DOCUMENTS

| | | |
|---|---|---|
| DE | 196 00 414 A1 | 7/1996 |
| DE | 100 39 953 C1 | 4/2002 |

(Continued)

OTHER PUBLICATIONS

European Search Report application No. EP10 73 8399 dated Jun. 15, 2012.

*Primary Examiner* — Stephen K Cronin
*Assistant Examiner* — Joseph Dallo
(74) *Attorney, Agent, or Firm* — Squire Sanders (US) LLP

(57) ABSTRACT

An atmospheric pressure estimating apparatus which estimates an atmospheric pressure applied to a calculation of control parameters of an internal combustion engine, is provided. An estimated intake air control valve passing air flow rate is calculated based on the estimated atmospheric pressure, the detected intake pressure, and the detected intake air control valve opening. The estimated atmospheric pressure is updated so that the estimated intake air control valve passing air flow rate coincides with the detected intake air control valve passing air flow rate. The estimated intake air control valve passing air flow rate is calculated using the updated estimated atmospheric pressure. The update of the estimated atmospheric pressure and the calculation of the estimated control valve passing air flow rate are sequentially performed. Consequently, the estimated control valve passing air flow rate follows the intake air flow rate, and the estimated atmospheric pressure follows the atmospheric pressure.

16 Claims, 18 Drawing Sheets

(56) References Cited

U.S. PATENT DOCUMENTS

| | | |
|---|---|---|
| 2006/0025916 A1* | 2/2006 | Tanaka et al. ............... 701/72 |
| 2009/0070011 A1* | 3/2009 | Takamiya et al. ............ 701/103 |
| 2009/0292452 A1* | 11/2009 | Nishimura et al. ........... 701/106 |

FOREIGN PATENT DOCUMENTS

| | | | | |
|---|---|---|---|---|
| DE | 102 22 195 A1 | 1/2003 | | |
| EP | 0 326 065 A2 | 8/1989 | | |
| EP | 0 478 120 A2 | 4/1992 | | |
| JP | 2-70957 | 3/1990 | | |
| JP | 6-101558 | 4/1994 | | |
| JP | 7-180597 | 7/1995 | | |
| JP | 10047121 A * | 2/1998 | ............... | F02D 41/04 |
| JP | 2002309992 A * | 10/2002 | ............... | F02D 45/00 |
| JP | 2006-46071 | 2/2006 | | |
| JP | 2008-196466 | 8/2006 | | |
| JP | 2010242727 A * | 10/2010 | | |
| JP | 2010285912 A * | 12/2010 | | |

* cited by examiner (a)

(b)

(c)

(d)

ATMOSPHERIC PRESSURE ESTIMATING APPARATUS

TECHNICAL FIELD

The present invention relates to an atmospheric pressure estimating apparatus for estimating an atmospheric pressure applied to a calculation of control parameters for an internal combustion engine.

BACKGROUND ART

The atmospheric pressure detected by the atmospheric pressure sensor is normally applied to the calculation of control parameters for the internal combustion engine, such as the fuel supply amount and the ignition timing. It is preferable to reduce the number of the sensors for calculating the engine control parameters as much as possible.

Patent document 1 (shown below) discloses a method for estimating an atmospheric pressure according to an intake pressure, an intake air temperature, an intake air flow rate, a throttle valve opening, and an idling control valve opening.

According to this atmospheric pressure estimating method, a flow related term FT is calculated using the intake pressure, the intake air temperature, and the intake air flow rate which are detected. The effective area term Aint is calculated from the throttle valve opening and the idling control valve opening. Subsequently, the pressure ratio map preliminarily set is retrieved according to the flow related term FT and the effective area term Aint, to calculate a pressure ratio (PA/MAP) of the atmospheric pressure PA with respect to the intake pressure MAP. The estimated atmospheric pressure is calculated by multiplying the intake pressure MAP by the pressure ratio (PA/MAP).

PRIOR ART DOCUMENT

Patent Document

Patent Document 1: U.S. Pat. No. 6,016,460

SUMMARY OF THE INVENTION

Problems to be Solved by the Invention

According to the method disclosed in the above-described Patent Document 1, it is necessary to preliminary set the pressure ratio map for calculating the pressure ratio (PA/MAP) by empirically obtaining the map set values. Consequently, the designing manpower increases due to the map setting.

Further, if the engine has a cylinder halting mechanism, for example, and the engine operation mode is switched between the partial-cylinder operation and the all-cylinder operation, it is necessary to prepare the map corresponding to each operating mode. Further, when a difference between the engine operating condition assumed as the reference for the map setting and the actual operating condition becomes greater, it is necessary to perform further correcting calculations.

The present invention was made contemplating the above-described points, and an objective of the invention is to provide an atmospheric pressure estimating apparatus, which can estimate the atmospheric pressure applied to the calculation of the engine control parameters by a simpler method with sufficient accuracy.

Means for Solving the Problems

To attain the above-described objective, the present invention provides an atmospheric pressure estimating apparatus having atmospheric pressure estimating means for estimating an atmospheric pressure applied to a calculation of control parameters of an internal combustion engine. The atmospheric pressure estimating apparatus is characterized by including intake pressure detecting means (8) for detecting an intake pressure (PBA) of the engine, intake air control valve passing air flow rate detecting means (13) for detecting a flow rate (GAIR) of air passing through an intake air control valve (3) of the engine, and control valve opening detecting means (4) for detecting an opening (TH) of the intake air control valve. The atmospheric pressure estimating means includes flow rate estimating means for calculating an estimated intake air control valve passing air flow rate (HGAIRTH) based on the estimated atmospheric pressure (HPA), the intake pressure (PBA), and the intake air control valve opening (TH), and updating means for updating the estimated atmospheric pressure (HPA) so that the estimated intake air control valve passing air flow rate (HGAIRTH) coincides with the detected intake air control valve passing air flow rate (GAIR). The flow rate estimating means calculates the estimated intake air control valve passing air flow rate (HGAIRTH) using the estimated atmospheric pressure (HPA) updated by the updating means.

With this configuration, the estimated intake air control valve passing air flow, rate is calculated based on the estimated atmospheric pressure, the detected intake pressure, and the detected intake air control valve opening. The estimated atmospheric pressure is updated so that the estimated intake air control valve passing air flow rate coincides with the detected intake air control valve passing air flow rate. Subsequently, the estimated intake air control valve passing air flow rate is calculated using the updated estimated atmospheric pressure.

That is, the update of the estimated atmospheric pressure and the calculation of the estimated intake air control valve passing air flow rate are sequentially performed, so that the estimated intake air control valve passing air flow rate follows the detected intake air control valve passing air flow rate, and the estimated atmospheric pressure follows the actual atmospheric pressure. Consequently, the estimated atmospheric pressure can accurately be calculated by a comparatively simple operation without retrieving maps.

Preferably, the atmospheric pressure estimating means applies the intake pressure (PBA) detected during a period from the time of the last stoppage of the engine to the time of completion of the cranking of the engine, as an initial value (HPAINI) of the estimated atmospheric pressure.

With this configuration, the intake pressure detected during the period from the time the last stoppage of the engine to the time of completion of the cranking of the engine, is applied as the initial value of the estimated atmospheric pressure. The detected intake pressure becomes substantially equal to the atmospheric pressure after engine stoppage, and takes a value near the atmospheric pressure until the cranking has completed (the self-sustaining operation starts). Therefore, the initial value of the estimated atmospheric pressure can be set appropriately.

Preferably, the atmospheric pressure estimating means sets the estimated atmospheric pressure (HPA) to the intake pressure (PBA) when the intake pressure (PBA) is higher than the estimated atmospheric pressure (HPA).

With this configuration, the estimated atmospheric pressure is set to the detected intake pressure when the detected intake pressure is higher than the estimated atmospheric pressure. The actual atmospheric pressure is equal to or higher than the intake pressure. Therefore, by setting (initializing) the estimated atmospheric pressure to the detected intake pressure when the detected intake pressure is higher than the estimated atmospheric pressure, it is possible to suppress deterioration of estimation accuracy due to the detection delay of the intake air control valve passing air flow rate detecting means, or to suppress deterioration of estimation accuracy upon the engine re-start immediately after the engine stoppage.

Preferably, the atmospheric pressure estimating apparatus further includes vehicle speed detecting means for detecting a running speed (VP) of the vehicle driven by the engine, and the updating means stops updating the estimated atmospheric pressure (HPA) when the vehicle speed (VP) is equal to or lower than a predetermined vehicle speed (VPL).

With this configuration, the update of the estimated atmospheric pressure is stopped when the vehicle speed is equal to or lower than the predetermined vehicle speed. The atmospheric pressure in the vicinity of the vehicle hardly changes when the vehicle speed is low. Therefore, by stopping the update, it is possible to suppress deterioration of estimation accuracy due to influence of the air supplied to the engine without passing through the intake air control valve.

Alternatively, the updating means may reduce an updating speed (CORHPA) of the estimated atmospheric pressure when the vehicle speed (VP) is equal to or lower than the predetermined vehicle speed (VPL).

With this configuration, the updating speed of the estimated atmospheric pressure is reduced when the vehicle speed is equal to or lower than the predetermined vehicle speed. The atmospheric pressure in the vicinity of the vehicle hardly changes when the vehicle speed is low. Accordingly, reducing the updating speed makes it possible to suppress deterioration of estimation accuracy due to influence of the air supplied to the engine without passing through the intake air control valve.

Preferably, the atmospheric pressure estimating means includes first averaging calculation means for calculating a first averaged estimated atmospheric pressure (HPA) by averaging the estimated atmospheric pressure (HPACAL) updated by the updating means, and second averaging calculation means for calculating a second averaged estimated atmospheric pressure (HPAF) by averaging the first averaged estimated atmospheric pressure (HPA). The atmospheric pressure estimating means outputs the second averaged estimated atmospheric pressure (HPAF). The flow rate estimating means calculates the estimated intake air control valve passing air flow rate (HGAIRTH) using the first averaged estimated atmospheric pressure (HPA).

With this configuration, the first averaged estimated atmospheric pressure is calculated by averaging the updated estimated atmospheric pressure, and the second averaged estimated atmospheric pressure is calculated by averaging the first averaged estimated atmospheric pressure. Subsequently, the second averaged estimated atmospheric pressure is output to be used for the calculation of the control parameters, and the first averaged estimated atmospheric pressure is applied to the calculation of the estimated intake air control valve passing air flow rate. By applying the first averaged estimated atmospheric pressure to the calculation of the estimated intake air control valve passing air flow rate, and outputting the second averaged estimated atmospheric pressure which is further averaged, it is possible to sufficiently attenuate changing components unnecessary for the calculation of the control parameters without degrading response performance of the estimating calculation.

Preferably, the atmospheric pressure estimating means includes flow rate detection delay correcting means for calculating a corrected estimated intake air control valve passing air flow rate (HGATAFS) by correcting the estimated intake air control valve passing air flow rate (HGAIRTH) according to a detection delay characteristic of the intake air control valve passing air flow rate detecting means (13). The updating means updates the estimated atmospheric pressure (HPA) so that the corrected estimated intake air control valve passing air flow rate (HGATAFS) coincides with the detected intake air control valve passing air flow rate (GAIR).

With this configuration, the corrected estimated intake air control valve passing air flow rate is calculated by correcting the estimated intake air control valve passing air flow rate according to the detection delay characteristic of the intake air control valve passing air flow rate detecting means. The estimated atmospheric pressure is updated so that the corrected estimated intake air control valve passing air flow rate coincides with the detected intake air control valve passing air flow rate. Consequently, it is possible to suppress deterioration of estimation accuracy due to the detection delay of the intake air control valve passing air flow rate detecting means.

Alternatively, the atmospheric pressure estimating means may include pressure detection delay correcting means for calculating a first corrected estimated intake air control valve passing air flow rate (HGATPBS) by correcting the estimated intake air control valve passing air flow rate (HGAIRTHa) according to a detection delay characteristic of the intake pressure detecting means (8), and flow rate detection delay correcting means for calculating a second corrected estimated intake air control valve passing air flow rate (HGATAFSa) by correcting the first corrected estimated intake air control valve passing air flow rate (HGATPBS) according to a detection delay characteristic of the intake air control valve passing air flow rate detecting means (13). The flow rate estimating means calculates the estimated intake air control valve passing air flow rate (HGAIRTHa) using an estimated value (HPBA) of the intake pressure. The updating means updates the estimated atmospheric pressure (HPA) so that the second corrected estimated intake air control valve passing air flow rate (HGARAFSa) coincides with the detected intake air control valve passing air flow rate (GAIR).

With this configuration, the estimated intake air control valve passing air flow rate is calculated using the estimated value of the intake pressure, and the first corrected estimated intake air control valve passing air flow rate is calculated by correcting the estimated intake air control valve passing air flow rate according to the detection delay characteristic of the intake pressure detecting means. Further, the second corrected estimated intake air control valve passing air flow rate is calculated by correcting the first corrected estimated intake air control valve passing air flow rate according to the detection delay characteristic of the intake air control valve passing air flow rate detecting means. Subsequently, the estimated atmospheric pressure is updated so that the second corrected estimated intake air control valve passing air flow rate coincides with the detected intake air control valve passing air flow rate. Consequently, it is possible to suppress deterioration of estimation accuracy due to the detection delay of the intake pressure detecting means and the detection delay of the intake air control valve passing air flow rate detecting means.

Alternatively, the atmospheric pressure estimating means may include the opening detection delay correcting means for calculating a first corrected estimated intake air control valve passing air flow rate (HGATTHS) by correcting the estimated intake air control valve passing air flow rate (HGAIRTHb) according to a detection delay characteristic of the intake air control valve opening detecting means (4), and the flow rate detection delay correcting means for calculating a second corrected estimated intake air control valve passing air flow rate (HGATAFSb) by correcting the first corrected estimated intake air control valve passing air flow rate (HGATTHS) according to a detection delay characteristic of the intake air control valve passing air flow rate detecting means (13). The flow rate estimating means calculates the estimated intake air control valve passing air flow rate (HGAIRTHb) using an estimated value (HTH) of the intake air control valve opening. The updating means updates the estimated atmospheric pressure (HPA) so that the second corrected estimated intake air control valve passing air flow rate (HGATAFSb) coincides with the detected intake air control valve passing air flow rate (GAIR).

With this configuration, the estimated intake air control valve passing air flow rate is calculated using the estimated value of the intake air control valve opening, and the first corrected estimated intake air control valve passing air flow rate is calculated by correcting the estimated intake air control valve passing air flow rate according to the detection delay characteristic of the intake air control valve opening detecting means. Further, the second corrected estimated intake air control valve passing air flow rate is calculated by correcting the first corrected estimated intake air control valve passing air flow rate according to the detection delay characteristic of the intake air control valve passing air flow rate detecting means. Subsequently, the estimated atmospheric pressure is updated so that the second corrected estimated intake air control valve passing air flow rate coincides with the detected intake air control valve passing air flow rate. Consequently, it is possible to suppress deterioration of estimation accuracy of estimation due to the detection delay of the intake air control valve opening detecting means and the detection delay of the intake air control valve passing air flow rate detecting means.

MODE FOR CARRYING OUT THE INVENTION

Preferred embodiments of the present invention will now be described with reference to the drawings.

First Embodiment

Figure 1:
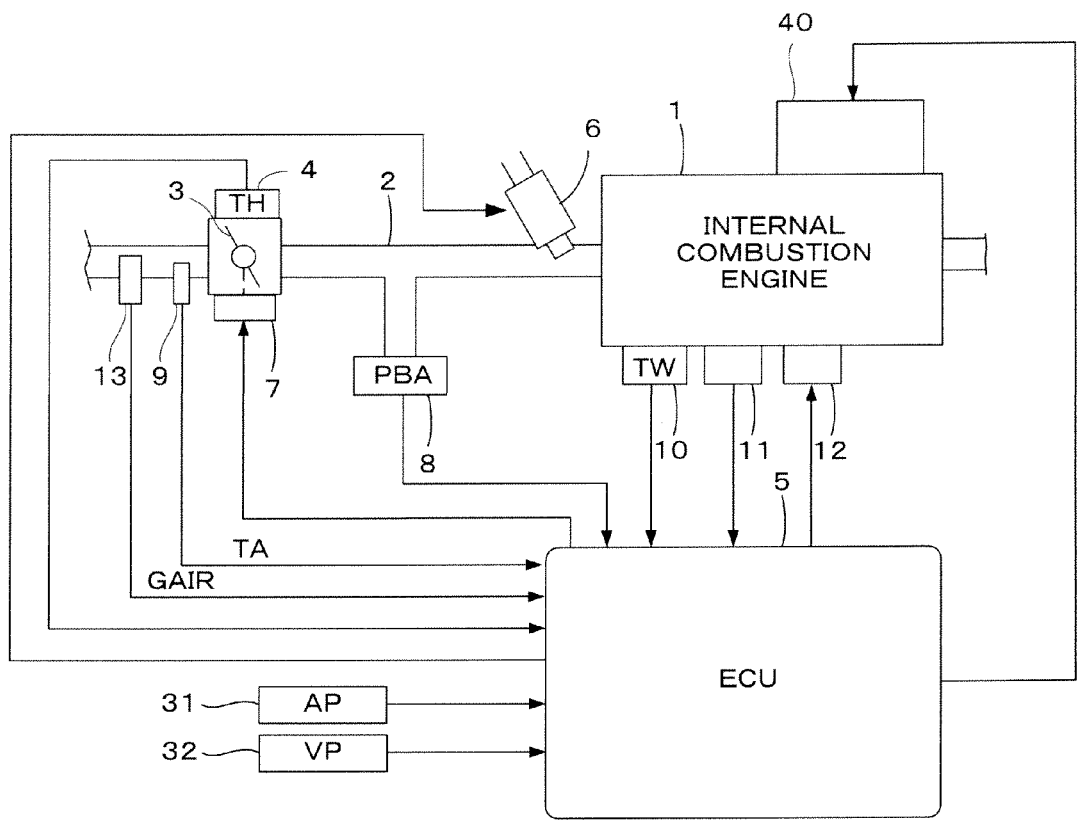
FIG. 1 shows a configuration of an internal combustion engine and a control system therefor according to one embodiment of the present invention.

FIG. 1 is a schematic diagram showing a configuration of an internal combustion engine and a control system therefor according to one embodiment of the present invention. Referring to FIG. 1, an internal combustion engine (hereinafter referred to as "engine") 1, for example, having four cylinders is provided with a cylinder halting mechanism 40 for halting operation of at least one of the cylinders by stopping operation of the intake valve(s) and exhaust valve(s) of the cylinder.

The engine 1 has an intake pipe 2 provided with a throttle valve 3. A throttle valve opening (TH) sensor 4 is connected to the throttle valve 3. The throttle valve opening sensor 4 outputs an electrical signal corresponding to an opening of the throttle valve 3, and supplies the electrical signal to an electronic control unit (referred to as "ECU") 5. An actuator 7 for actuating the throttle valve 3 is connected to the throttle valve 3, and the operation of the actuator 7 is controlled by the ECU 5.

The intake pipe 2 is provided with an intake air flow rate sensor 13 for detecting an intake air flow rate GAIR which is a flow rate of air supplied to the engine 1 through the throttle valve 3, and an intake air temperature sensor 9 for detecting an intake air temperature TA, which is disposed upstream of the throttle valve 3. The detection signals of these sensors 13 and 9 are supplied to the ECU 5.

A fuel injection valve 6 is provided in the intake pipe 2 for each cylinder at a position slightly upstream of an intake valve (not shown) and between the engine 1 and the throttle valve 3. Each injection valve is connected to a fuel pump (not shown) and electrically connected to the ECU 5. A valve opening period of the fuel injection valve 6 is controlled by a signal from the ECU 5.

Each cylinder of the engine 1 is provided with a spark plug 12 which is connected to the ECU 5. The ECU 5 supplies an ignition signal to each spark plug 12, and performs an ignition timing control.

An intake pressure sensor 8 for detecting an intake pressure PBA is disposed downstream of the throttle valve 3. Further, an engine coolant temperature sensor 10 for detecting an engine coolant temperature TW is mounted on the body of the engine 1. The detection signals from these sensors 8 and 10 are supplied to the ECU 5.

A crank angle position sensor 11 for detecting a rotational angle of a crankshaft (not shown) of the engine 1 is connected to ECU 5. A signal corresponding to the detected rotational angle of the crankshaft is supplied to the ECU 5. The crank angle position sensor 11 includes a cylinder discrimination sensor which outputs a pulse (hereinafter referred to as "CYL pulse") at a predetermined angle position of a specific cylinder of the engine 1. The crank angle position sensor also includes a TDC sensor which outputs a TDC pulse at a crank angle position of a predetermined crank angle before a top dead center (TDC) starting an intake stroke in each cylinder (i.e., at every 180 degrees crank angle in the four-cylinder engine) and a CRK sensor for generating a CRK pulse with a constant crank angle period (e.g., a period of 6 degrees) which is shorter than the period of generation of the TDC pulse. The CYL pulse, the TDC pulse, and the CRK pulse are supplied to the ECU 5. The CYL pulse, the TDC pulse, and the CRK pulse are used to control various timings, such as the fuel injection timing and the ignition timing, and to detect an engine rotational speed NE.

An accelerator sensor 31 and a vehicle speed sensor 32 are also connected to the ECU 5. The accelerator sensor 31 detects a depression amount AP of an accelerator pedal of the vehicle driven by the engine 1 (this depression amount will be hereinafter referred to as "accelerator operation amount"). The vehicle speed sensor 32 detects a running speed (vehicle speed) VP of the vehicle. The detection signals from these sensors are supplied to the ECU 5.

The ECU 5 includes an input circuit having various functions including a function of shaping the waveforms of the input signals from the various sensors, a function of correcting the voltage level of the input signals to a predetermined level, and a function of converting analog signal values into digital signal values. The ECU 5 further includes a central processing unit (hereinafter referred to as "CPU"), a memory circuit, and an output circuit. The memory circuit preliminarily stores various operating programs to be executed by the CPU and the results of computation or the like by the CPU. The output circuit supplies drive signals to the actuator 7, the fuel injection valves 6, and the cylinder halting mechanism 40.

The CPU in the ECU 5 performs an ignition timing control, an opening control of the throttle valve 3, a control of an amount of fuel to be supplied to the engine 1 (a control of the opening period of each fuel injection valve 6), and a cylinder halting operation control according to the detected signals from the above-described sensors.

Further, the CPU in the ECU 5 executes an atmospheric pressure estimation process for estimating the atmospheric pressure PA. An estimated atmospheric pressure (HPAF) obtained by the atmospheric pressure estimation process is applied to the control of the engine 1, such as the above-described ignition timing control, the fuel amount control, and the like.

Figure 2:
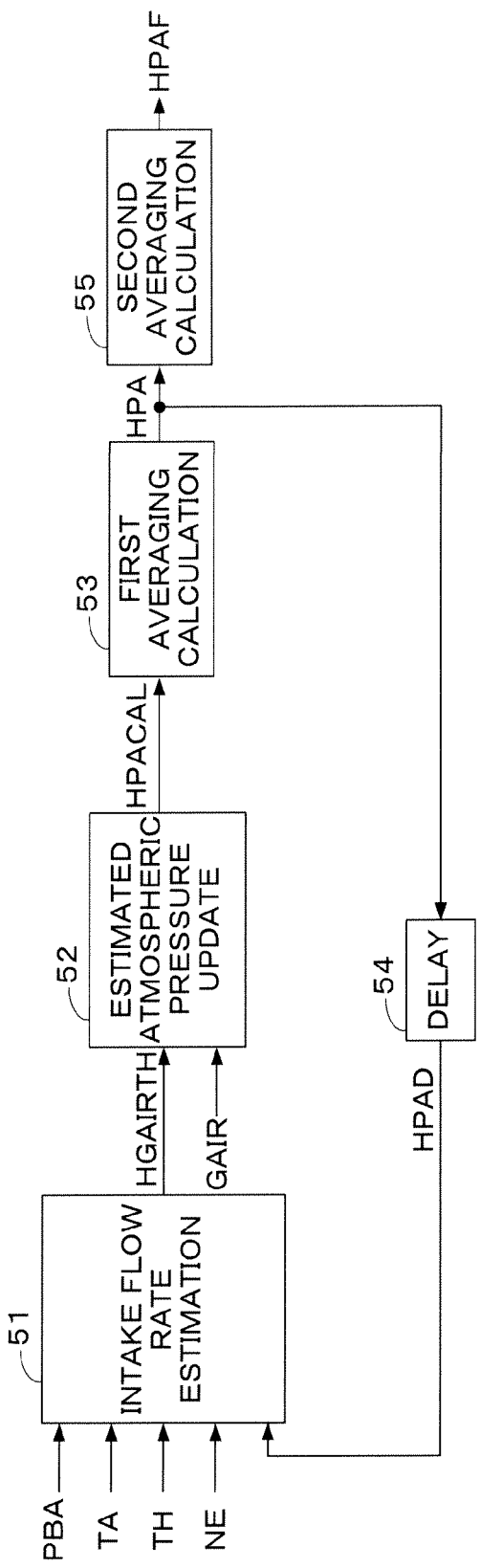
FIG. 2 is a block diagram showing a configuration of an atmospheric pressure estimation module (first embodiment).

FIG. 2 is a block diagram showing a configuration of an atmospheric pressure estimation module for executing the atmospheric pressure estimation process. The function of each block shown in FIG. 2 is realized by the calculation process executed by the CPU in the ECU 5 as described below.

The atmospheric pressure estimation module shown in FIG. 2 includes an intake air flow rate estimation block 51, an estimated atmospheric pressure update block 52, a first averaging calculation block 53, a delay block 54, and a second averaging calculation block 55.

The intake air flow rate estimation block 51 calculates an estimated throttle valve passing air flow rate HGAIRTH by applying the intake pressure PBA, the intake air temperature TA, the throttle valve opening TH, and the engine rotational speed NE which are detected, and the estimated atmospheric pressure HPAD which is output one calculation period before from the first averaging calculation block 53, to the following equation (1). "KC" in the equation (1) is a conversion constant for converting a flow rate value to a value whose dimension is "g/sec", "KTH(TH)" is an opening area flow rate function calculated according to the throttle valve opening TH, Ψ (PBA/HPAD) is a pressure ratio flow rate function calculated according to a ratio of an upstream side pressure (HPAD) and a downstream side pressure (PBA) of the throttle valve 3, and "R" is the gas constant. The opening area flow rate function KTH is preliminarily and experimentally obtained, and stored as a table. Further, the pressure ratio flow rate function Ψ is given by the following equation (2). "κ" in the equation (2) is a specific heat ratio of air. It is to be noted that the pressure ratio flow rate function Ψ takes a maximum value irrespective of the pressure ratio when the air flow velocity exceeds the acoustic velocity. Accordingly, in the actual calculation process, the pressure ratio flow rate function IV which is preliminarily stored as a table (refer to FIG. 5(*b*)) is used.

[Eq. 1]

$$HGAIRTH = \frac{KC \times HPAD \times KTH(TH) \times \psi\left(\frac{PBA}{HPAD}\right)}{\sqrt{R \times (273 + TA)}} \quad (1)$$

$$\psi\left(\frac{PBA}{HPAD}\right) = \sqrt{\frac{2\kappa}{\kappa-1}\left\{\left(\frac{PBA}{HPAD}\right)^{\frac{2}{\kappa}} - \left(\frac{HPAD}{PBA}\right)^{\frac{\kappa+1}{\kappa}}\right\}} \quad (2)$$

The estimated atmospheric pressure update block 52 updates the estimated atmospheric pressure HPA so that the estimated throttle valve passing air flow rate HGAIRTH coincides with the detected intake air flow rate GAIR, to calculate an estimated atmospheric pressure HPACAL which is not subjected to the first averaging calculation (this estimated atmospheric pressure will be hereinafter referred to as "updated estimated atmospheric pressure").

The first averaging calculation block 53 applies the updated estimated atmospheric pressure HPACAL to the following equation (3), to calculate the estimated atmospheric pressure HPA. In the equation (3), "k" is a discrete time digitized with the calculation period, and "CA1" is an averaging coefficient set to a value between "0" and "1". "(k)" for indicating the present value is omitted.

$$HPA = CA1 \times HPACAL + (1-CA1) \times HPA(k-1) \quad (3)$$

The delay block 54 delays the estimated atmospheric pressure HPA by one calculation period, to output an delayed estimated atmospheric pressure HPAD (=HPA(k−1)).

The second averaging calculation block 55 applies the estimated atmospheric pressure HPA to the following equation (4), to calculate an averaged estimated atmospheric pressure HPAF. In the equation (4), "CA2" is an averaging coefficient set to a value between "0" and "1".

$$HPAF = CA2 \times HPA + (1-CA2) \times HPAF(k-1) \quad (4)$$

In this embodiment, the averaged estimated atmospheric pressure HPAF calculated by the equation (4) is applied to the calculation of engine control parameters, such as the ignition timing, the fuel supply amount, and the like.

Figure 3:
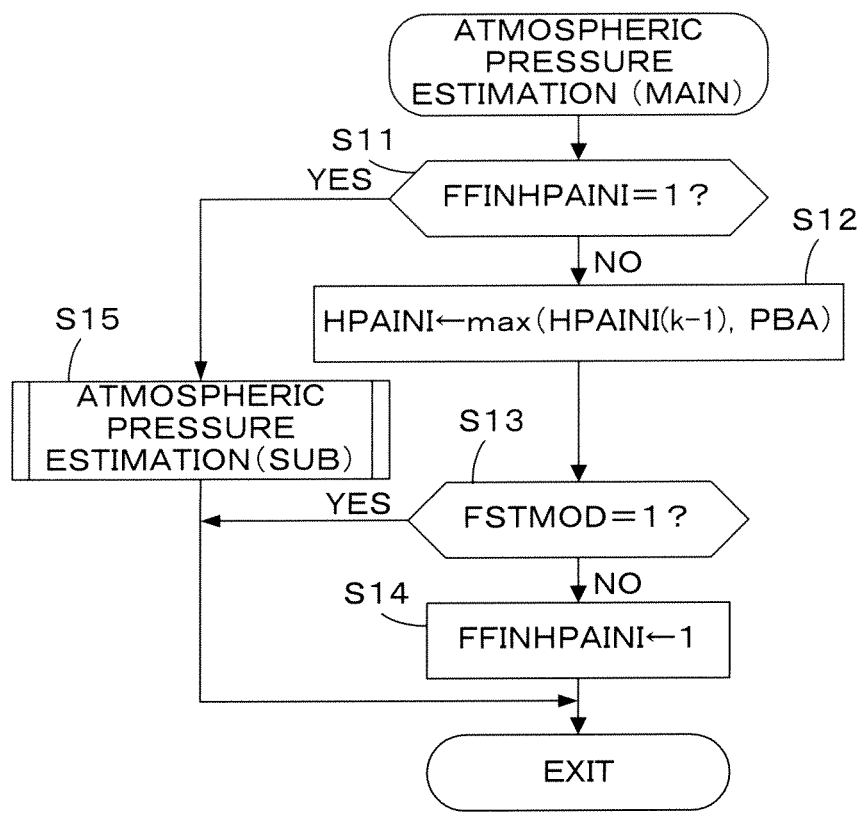
FIG. 3 is a flowchart of a main routine of an atmospheric pressure estimation process.

FIG. 3 is a flowchart of a main routine of the atmospheric pressure estimation process which realizes the function of the atmospheric pressure estimation module shown in FIG. 2.

This process is executed by the CPU in the ECU 5 in synchronism with generation of the TDC pulse.

In step S11, it is determined whether or not a first initialization flag FFINHPAINI is equal to "1". Since the answer to step S11 is initially negative (NO), an initial estimated atmospheric pressure HPAINI is set to a value which is greater one of the preceding value of HPAINI and the intake pressure PBA by the following equation (5) (step S12).

$$HPAINI = \max(HPAINI(k-1), PBA) \quad (5)$$

In step S13, it is determined whether or not a start mode flag FSTMOD is equal to "1". The start mode flag FSTMOD is set to "1" during the cranking (the period from the beginning of the engine start to the time the self-sustaining operation of the engine 1 starts). During the cranking, the process immediately ends. If the self-sustaining operation has started, the process proceeds to step S14, in which a first initialization flag FFINHPAINI is set to "1".

After execution of step S14, the answer to step S11 becomes affirmative (YES). The process proceeds to step S15 in which the atmospheric pressure estimating subroutine shown in FIG. 4 is executed.

Figure 4:
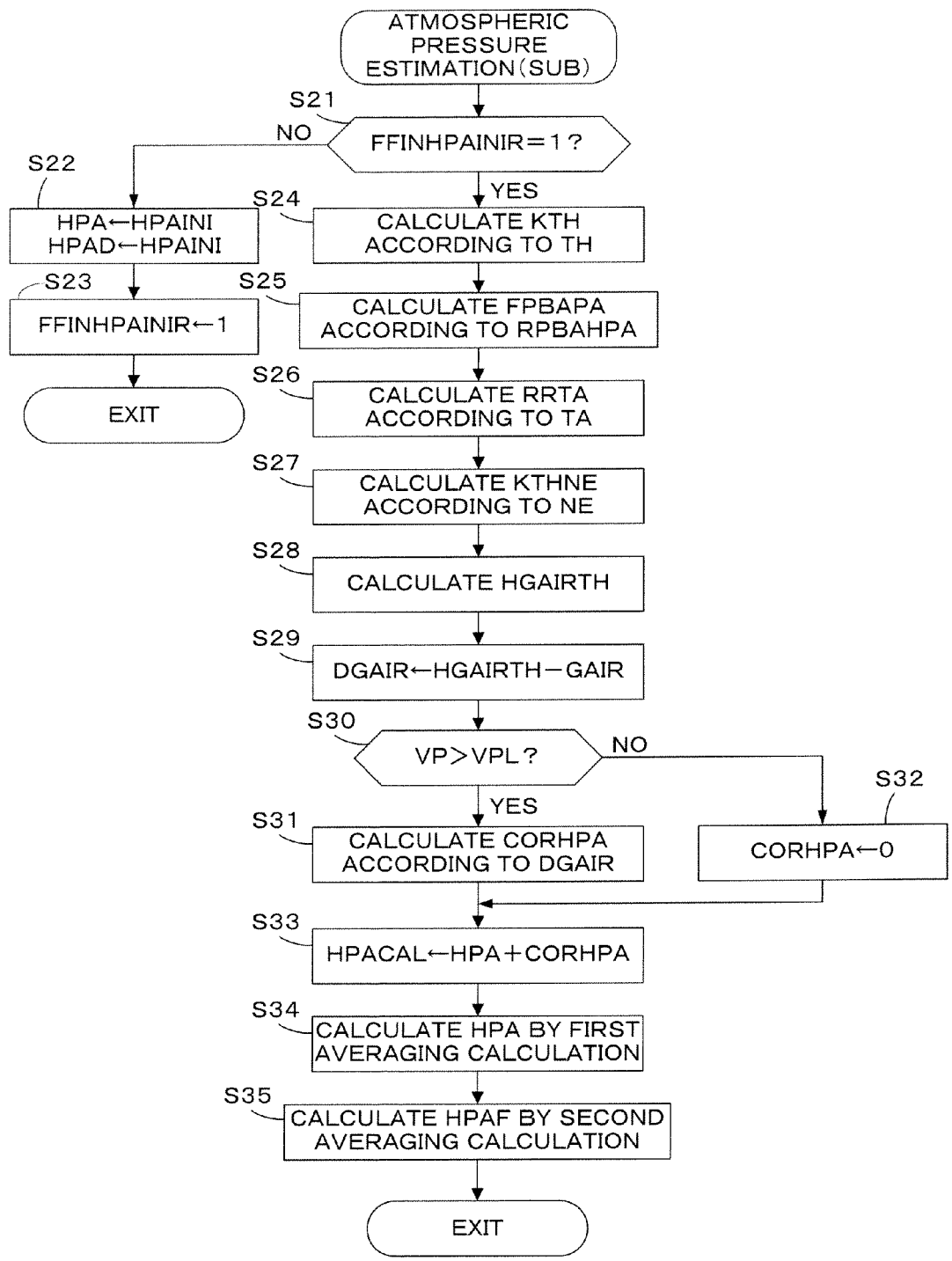
FIG. 4 is a flowchart of a subroutine executed in the process shown in FIG. 3.

In step S21 of FIG. 4, it is determined whether or not a second initialization flag FFINHPAINIR is equal to "1". Since the answer to step S21 is initially negative (NO), the process proceeds to step S22, in which both of the estimated atmospheric pressure HPA and the delayed estimated atmospheric pressure HPAD are set to the initial estimated atmospheric pressure HPAINI. Subsequently, the second initialization flag FFINHPAINIR is set to "1" (step S23), and the process ends.

After execution of step S23, the answer to step S21 becomes affirmative (YES), and step S24 and the subsequent steps are performed.

Figure 5:
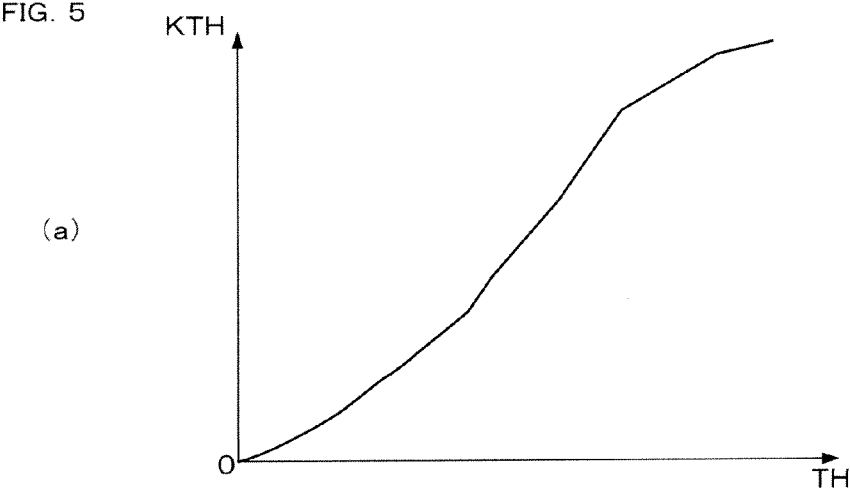
FIG. 5 shows tables referred to in the process of FIG. 4.
Figure 5:
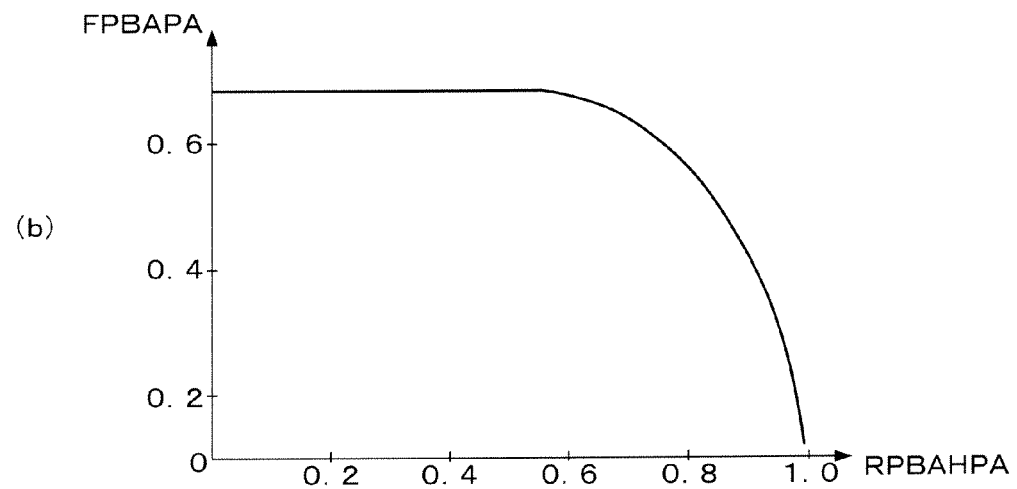
Figure 5:
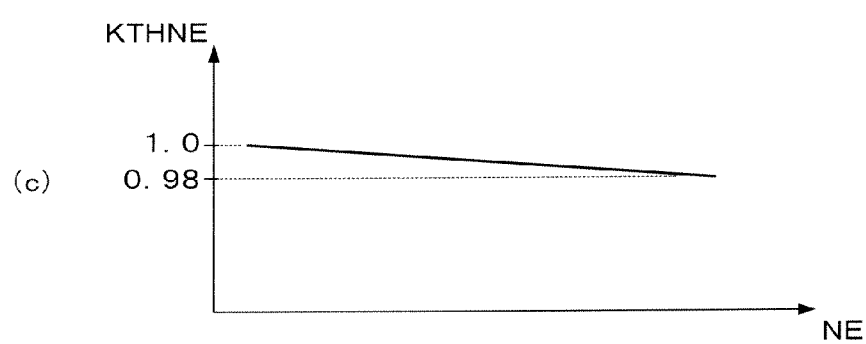
Figure 5:
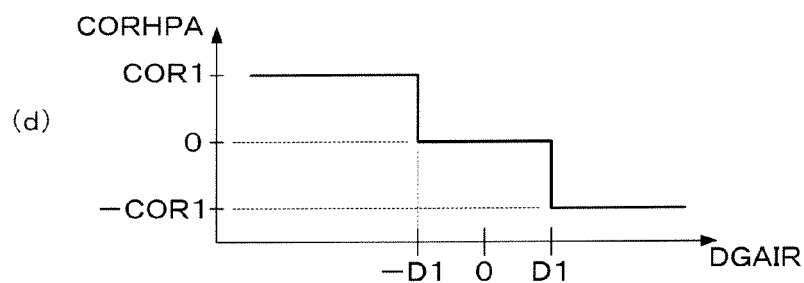

In step S24, a KTH table shown in FIG. 5(*a*) is retrieved according to the throttle valve opening TH, to calculate an opening area flow rate function value KTH. The KTH table is set so that the opening area flow rate function value KTH increases as the throttle valve opening TH increases.

In step S25, a pressure ratio RPBAHPA which is a ratio of the intake pressure PBA with respect to the delayed estimated atmospheric pressure HPAD is calculated by the following equation (6). Further, an FPBAPA table shown in FIG. 5(*b*) is retrieved according to the pressure ratio RPBAHPA, to calculate a pressure ratio flow rate function value FPBAPA.

$$RPBAHPA = PBA/HPAD \quad (6)$$

In step S26, an RRTA table (not shown) is retrieved according to the intake air temperature TA, to calculate an intake air temperature parameter RRTA. The RRTA table is obtained by storing calculation results of the following equation (7) as a table. The equation (7) corresponds to the denominator of the equation (1).

[Eq. 2]

$$RRTA = \sqrt{R \times (273 + TA)} \quad (7)$$

In step S27, a KTHNE table is retrieved according to the engine rotational speed NE, to calculate a rotational speed correction coefficient KTHNE. The KTHNE table is set so that the rotational speed correction coefficient KTHNE decreases as the engine rotational speed NE increases. The rotational speed correction coefficient KTHNE is a parameter for correcting the pressure loss due to the air cleaner disposed upstream of the intake air flow rate sensor 13. The rotational speed correction coefficient KTHNE is set contemplating that the pressure loss due to the air cleaner increases as the engine rotational speed NE increases. It is to be noted that the influence of the air cleaner is normally not so great. Accordingly, the rotational speed correction coefficient KTHNE may be set to "1", which means that the correction according to the engine rotational speed NE is not performed.

In step S28, the opening area flow rate function value KTH, the pressure ratio flow rate function value FPBAPA, the intake air temperature parameter RRTA, the delayed estimated atmospheric pressure HPAD, and the rotational speed correction coefficient KTHNE are applied to the following equation (1a), to calculate the estimated throttle valve passing air flow rate HGAIRTH.

$$HGAIRTH = KC \times HPAD \times KTH \times FPBAPA \times KTHNE / RRTA \quad (1a)$$

The process of steps S24 to S28 described above corresponds to the calculation performed by the intake air flow rate estimation block 51.

In step S29, a flow rate deviation DGAIR is calculated by the following equation (11).

$$DGAIR = HGAIRTH - GAIR \quad (11)$$

In step S30, it is determined whether or not the vehicle speed VP is higher than a predetermined low vehicle speed VPL (for example, "0"). If the answer to step S30 is negative (NO), an updating amount CORHPA is set to "0" (step S32). On the other hand, if the vehicle speed VP is higher than the predetermined low vehicle speed VPL, a CORHPA table shown in FIG. 5(*d*) is retrieved according to the flow rate deviation DGAIR, to calculate the updating amount CORHPA (step S31). The CORHPA table is set as described below. When the flow rate deviation DGAIR is in a predetermined range in the vicinity of "0" (a range from a predetermined value −D1 to a predetermined value D0, the updating amount CORHPA is set to "0". When the flow rate deviation DGAIR is less than the predetermined value −D1, the updating amount CORHPA is set to a predetermined amount COR1 (>0). When the flow rate deviation DGAIR is greater than the predetermined value D1, the updating amount CORHPA is set to the predetermined amount −COR1.

In step S33, the updating amount CORHPA is added to the estimated atmospheric pressure HPA (the preceding value) by the following equation (12), to calculate the updated estimated atmospheric pressure HPACAL.

$$HPACAL = HPA + CORHPA \quad (12)$$

In step S34, the estimated atmospheric pressure HPA is calculated by the averaging calculation using the above-described equation (3). In step S35, the averaged estimated atmospheric pressure HPAF is calculated by the averaging calculation using the above-described equation (4).

Figure 6:
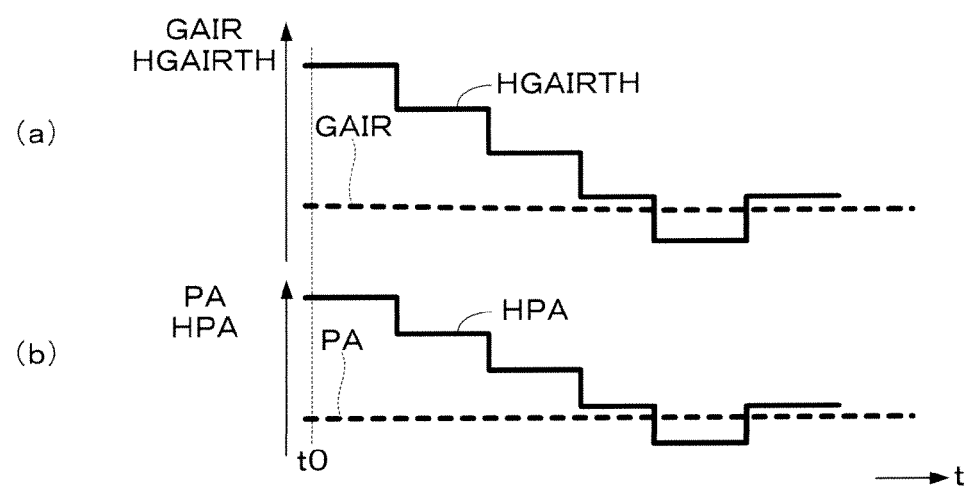
FIG. 6 shows time charts for illustrating a manner in which the estimated atmospheric pressure (HPACAL) follows the actual atmospheric pressure (PA).

FIG. 6 shows time charts for illustrating changes in the estimated atmospheric pressure HPA in this embodiment. The time charts in FIG. 6 correspond to an example that the initial set value of the estimated atmospheric pressure HPA is greatly deviated from the atmospheric pressure PA. In this example, the estimated atmospheric pressure HPA is largely greater than the atmospheric pressure PA at time t0. Accordingly, the flow rate deviation DGAIR is large, and the updating amount CORHPA is set to the negative predetermined amount "−COR1". Consequently, the estimated throttle valve passing air flow rate HGAIRTH gradually decreases, and the estimated atmospheric pressure HPA decreases with the decrease in the estimated throttle valve passing air flow rate HGAIRTH, to finally coincide with the atmospheric pressure PA. In FIG. 6, the estimated atmospheric pressure HPA which is not subjected to the first averaging calculation is indicated for illustrating the estimation principle. It is to be noted that the estimated atmospheric pressure HPA is initialized by a detected intake pressure PBA immediately after the engine start as described above, the estimated atmospheric pressure HPA is substantially equal to the atmospheric pressure PA from the beginning. Accordingly, the estimated atmospheric pressure HPA changes so as to follow changes in the atmospheric pressure PA.

Figure 7:
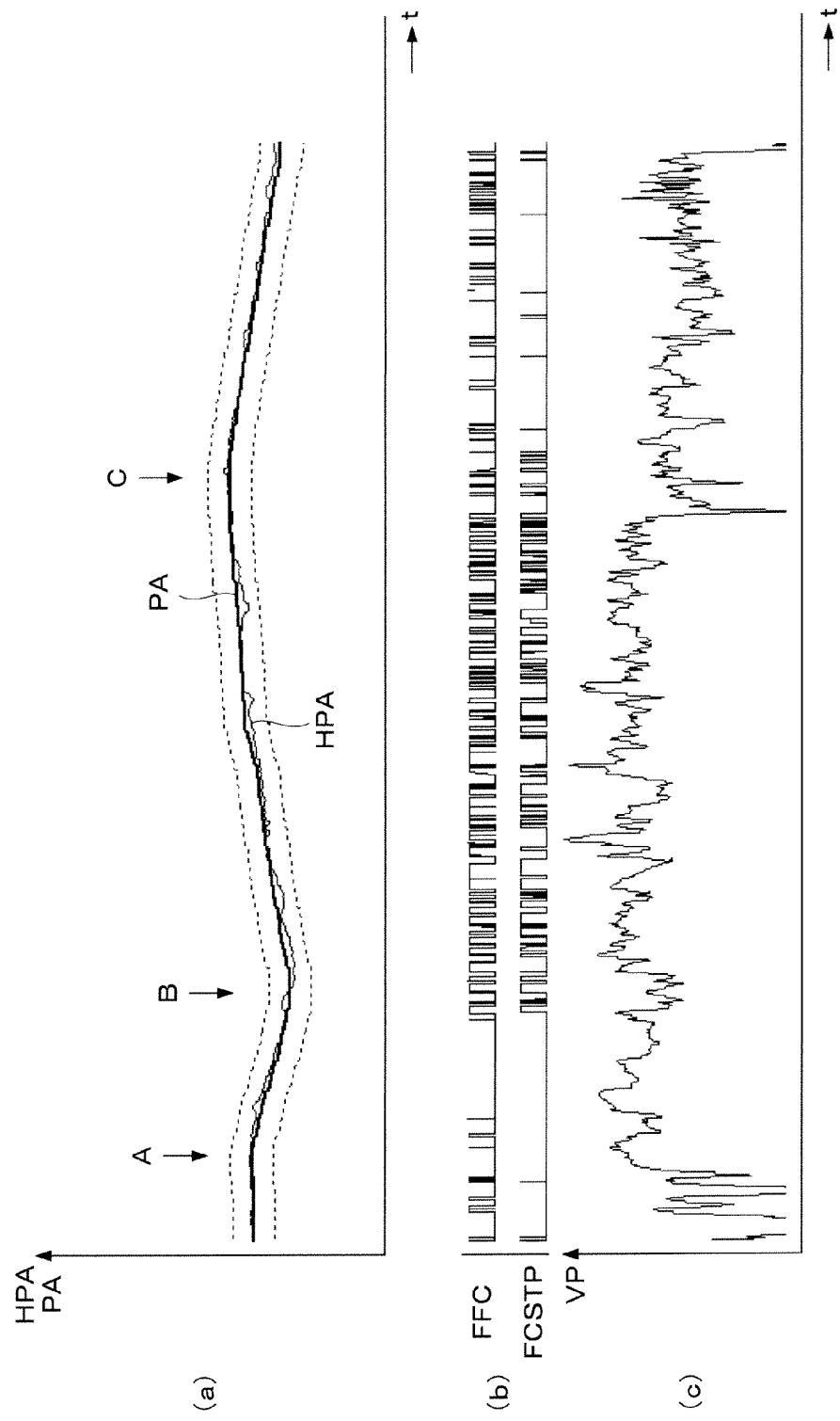
FIG. 7 shows time charts of a test result.

FIG. 7 shows time charts of a test result. These time charts show changes in the atmospheric pressure PA, the estimated atmospheric pressure HPA (FIG. 7(a)), the fuel-cut flag FFC, the cylinder halt flag FCSTP (FIG. 7b)), and the vehicle speed VP (FIG. 7(c)) when the test vehicle runs up from the point A at 2600m in elevation to the point B at 3000m in elevation, and runs down to the point C at 2200m in elevation. It is to be noted that two dashed lines shown in FIG. 7(a) indicate an error range of about ±4.5%. Further, the average vehicle speed when moving from the point A to the point C is about 100 km/h.

As apparent from FIG. 7, according to the atmospheric pressure estimating method of this embodiment, the estimated atmospheric pressure HPA can follow comparatively rapid changes in the atmospheric pressure PA, to obtain an accurate value of the estimated atmospheric pressure HPA. Further, even if the fuel cut operation or the partial cylinder halting operation is performed, good estimation accuracy can be maintained.

Figure 8:
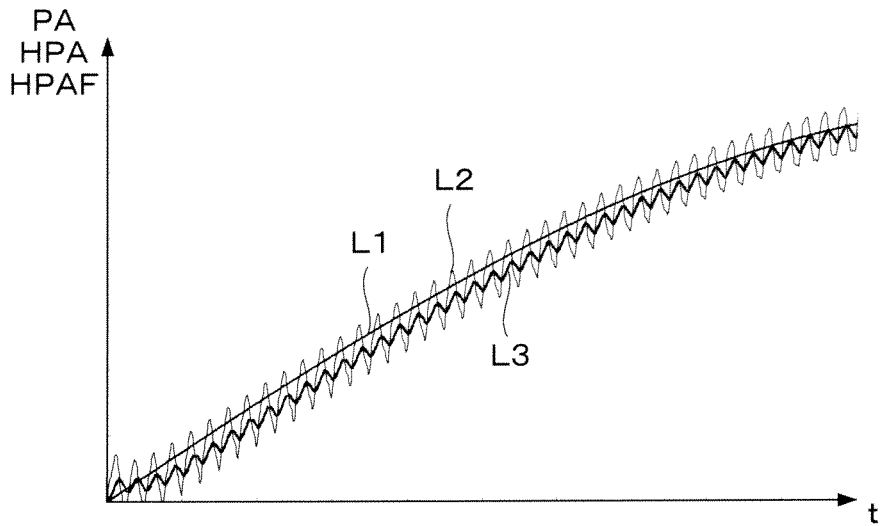
FIG. 8 is a time chart for illustrating averaging calculations of the estimated atmospheric pressure.

FIG. 8 is a time chart showing changes in the atmospheric pressure PA (curve L1), the estimated atmospheric pressure HPA (curve L2), and the averaged estimated atmospheric pressure HPAF (curve L3). FIG. 8 shows an example obtained by performing a simulation in which a periodical disturbance is applied to the throttle valve opening TH.

In this embodiment, the estimated atmospheric pressure HPA obtained by performing the first averaging calculation is applied to the calculation of the estimated throttle valve passing air flow rate HGAIRTH, and the averaged estimated atmospheric pressure HPAF obtained by performing the second averaging calculation of the estimated atmospheric pressure HPA is applied to the calculation of the control parameters. By performing two steps of the averaging calculation as described above, it is possible to make the estimated atmospheric pressure HPA follow changes in the atmospheric pressure PA with sufficient accuracy, and to sufficiently attenuate the disturbance component contained in the averaged estimated atmospheric pressure HPAF which is applied to the control parameter calculation.

As described above, in this embodiment, the estimated throttle valve passing air flow rate HGAIRTH is calculated based on the delayed estimated atmospheric pressure HPAD which is the preceding value of the estimated atmospheric pressure HPA, the detected intake pressure PBA, and the throttle valve opening TH. The estimated atmospheric pressure HPA is updated so that the estimated throttle valve passing air flow rate HGAIRTH coincides with the detected intake air flow rate GAIR. The estimated throttle valve passing air flow rate HGAIRTH is calculated using the updated estimated atmospheric pressure HPA. That is, the update of the estimated atmospheric pressure HPA and the calculation of the estimated throttle valve passing air flow rate HGAIRTH are sequentially performed, so that the estimated throttle valve passing air flow rate HGAIRTH follows the detected intake air flow rate GAIR, and the estimated atmospheric pressure HPA follows the actual atmospheric pressure PA. Consequently, the estimated atmospheric pressure HPA can accurately be calculated by a comparatively simple operation without retrieving maps.

Further, the maximum value of the intake pressure PBA detected during a period from the time of the last stoppage of the engine to the time of completion of the cranking of the engine, is applied as the initial estimated atmospheric pressure HPAINI (FIG. 3, step S12). The detected intake pressure PBA becomes substantially equal to the atmospheric pressure PA after engine stoppage, and takes a value near the atmospheric pressure PA until the cranking has completed (the self-sustaining operation starts). Therefore, the initial value of the estimated atmospheric pressure HPA can be set appropriately. By adopting the maximum value of the intake pressure PBA as the initial estimated atmospheric pressure HPAINI, the effect that the estimated atmospheric pressure HPA earlier converges to the atmospheric pressure PA after starting the estimating process, is obtained. Alternatively, the initial estimated atmospheric pressure HPAINI may be set to the intake pressure PBA detected at any timing in the period before the self-sustaining operation starts.

Further, when the vehicle speed VP is lower than the predetermined low vehicle speed VPL, e.g., when the vehicle stops, the update of the estimated atmospheric pressure HPA is stopped. When the vehicle speed VP is low, the atmospheric pressure PA in the vicinity of the vehicle hardly changes. Therefore, stopping the update makes it possible to suppress deterioration of the estimation accuracy due to the air supplied to the engine without passing through the throttle valve (for example, the air which passes through a bypass passage bypassing the throttle valve in the engine having the bypass passage and the idling control valve therein, or the air which passes through the blow-by gas passage).

In this embodiment, the throttle valve opening sensor 4, the intake air flow rate sensor 13, the intake pressure sensor 8, and the vehicle speed sensor 32 respectively correspond to the control valve opening detecting means, the intake air control valve passing air flow rate detecting means, the intake pressure detecting means, and the vehicle speed detecting means. The ECU 5 constitutes the atmospheric pressure estimating means, the flow rate estimating means, the updating means, the first averaging calculation means, and the second averaging calculation means. Specifically, the process of FIGS. 3 and 4 corresponds to the atmospheric pressure estimating means, steps S24 to S28 of FIG. 4 correspond to the flow rate estimating means, steps S29 to S33 correspond to the updating means, and steps S34 and S35 respectively correspond to the first averaging calculation means and the second averaging calculation means.

[Modification 1]

Figure 9:
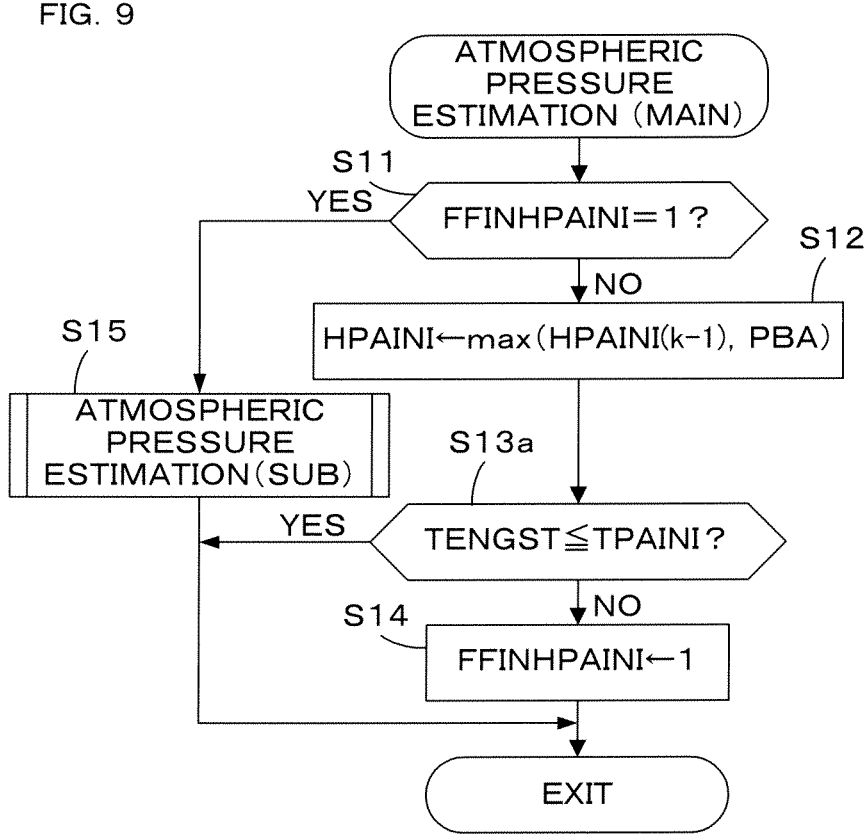
FIG. 9 is a flowchart of a modification of the process shown in FIG. 3.

FIG. 9 is a flowchart for showing a modification of the atmospheric pressure estimation process (main routine) shown in FIG. 3.

The process of FIG. 9 is obtained by replacing step S13 of FIG. 3 with step S13a. In step S13a, it is determined whether or not an elapsed time period TENGST from the beginning of the cranking is equal to or less than a predetermined time period TPAINI. While the answer to step S13a is affirmative (YES), the process immediately ends and step S12 is executed. If the elapsed time period TENGST reaches the predetermined time period TPAINI, the process proceeds to step S14, in which the first initialization flag FFINHPAINI is set to "1".

According to the process of FIG. 9, the initial estimated atmospheric pressure HPAINI is continuously updated until a predetermined timing before the self sustaining operation starts.

In the above-described embodiment and in this modification, the initial estimated atmospheric pressure HPAINI is calculated using the intake pressure PBA detected after the beginning of the cranking. Alternatively, the initial estimated atmospheric pressure HPAINI may be set to the intake pressure PBA detected during the period from the time the last engine operation ends (the engine stops) to the start time of the cranking, since it is considered that the atmospheric pressure PA does not so largely change during the engine stoppage period (the vehicle stoppage period) that the change in the atmospheric pressure PA gives large influence to the calculation result of the engine control parameters.

[Modification 2]

The calculation in step S33 of FIG. 4 may be performed with the following equation (12a) instead of the equation (12).

$$HPACAL = \max(HPA + CORHPA, PBA) \tag{12a}$$

According to the equation (12a), the updated estimated atmospheric pressure HPACAL is set to the intake pressure PBA if the detected intake pressure PBA is higher than the updated value (HPA+CORHPA). This setting of HPACAL makes it possible to suppress deterioration of estimation accuracy, when the estimated atmospheric pressure HPA decreases due to a detection delay of the intake air flow rate sensor 13 and the difference between the estimated atmospheric pressure HPA and the atmospheric pressure PA increases.

[Modification 3]

In the process of FIG. 4, the predetermined low vehicle speed VPL is set, for example, to "0" and the updating amount CORHPA is set to "0" when the vehicle stops (step S32). Alternatively, the predetermined low vehicle speed VPL may be set to a value greater than "0" (for example, 10 km/h) and the updating amount CORHPA may be set to a predetermined amount COR2 (−COR2) whose absolute value is less than the predetermined amount COR1 (−COR1) by the same process as step S31. According to this setting of VPL and CORHPA, the updating speed of the estimated atmospheric pressure HPA is reduced when the vehicle speed VP is equal to or lower than the predetermined low vehicle speed VPL, compared with the updating speed for the time when the vehicle speed VP is higher than the predetermined low vehicle speed VPL. Consequently, it is possible to suppress deterioration of estimation accuracy of the atmospheric pressure due to influence of the air supplied to the engine 1 without passing through the throttle valve 3.

Second Embodiment

Figure 10:
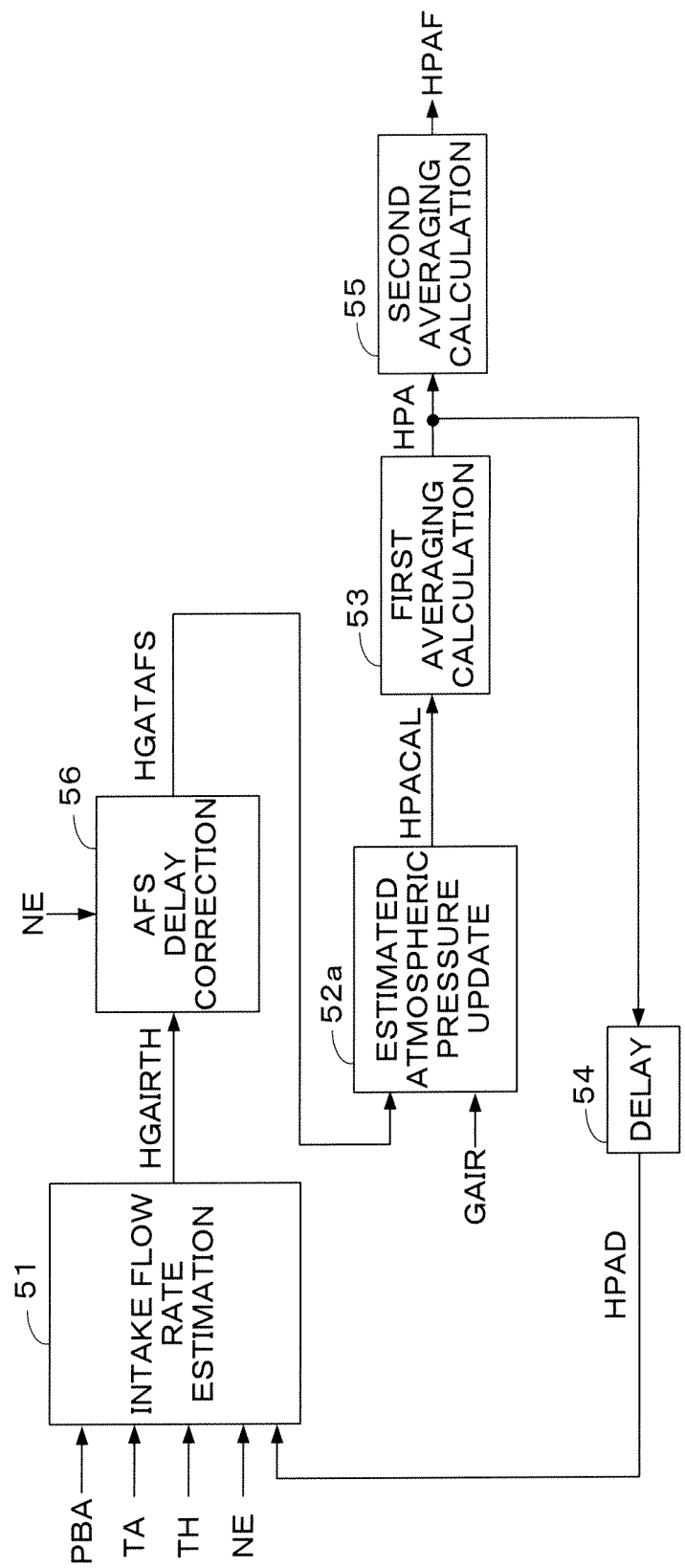
FIG. 10 is a block diagram showing a configuration of the atmospheric pressure estimation module (second embodiment).

FIG. 10 is a block diagram showing a configuration of the atmospheric pressure estimation module according to a second embodiment of the present invention. The atmospheric pressure estimation module shown in FIG. 10 is obtained by adding an AFS delay correction block 56 to the atmospheric pressure estimation module of FIG. 2, and replacing the estimated atmospheric pressure update block 52 with an estimated atmospheric pressure update block 52a. This embodiment is the same as the first embodiment except for this point.

The AFS delay correction block 56 corrects the estimated throttle valve passing air flow rate HGAIRTH according to a detection delay characteristic of the intake air flow rate sensor 13, to calculate an AFS corrected estimated throttle valve passing air flow rate HGATAFS. The estimated atmospheric pressure update block 52a calculates the updated estimated atmospheric pressure HPACAL so that the AFS corrected estimated throttle valve passing air flow rate HGATAFS coincides with the intake air flow rate GAIR.

Figure 11:
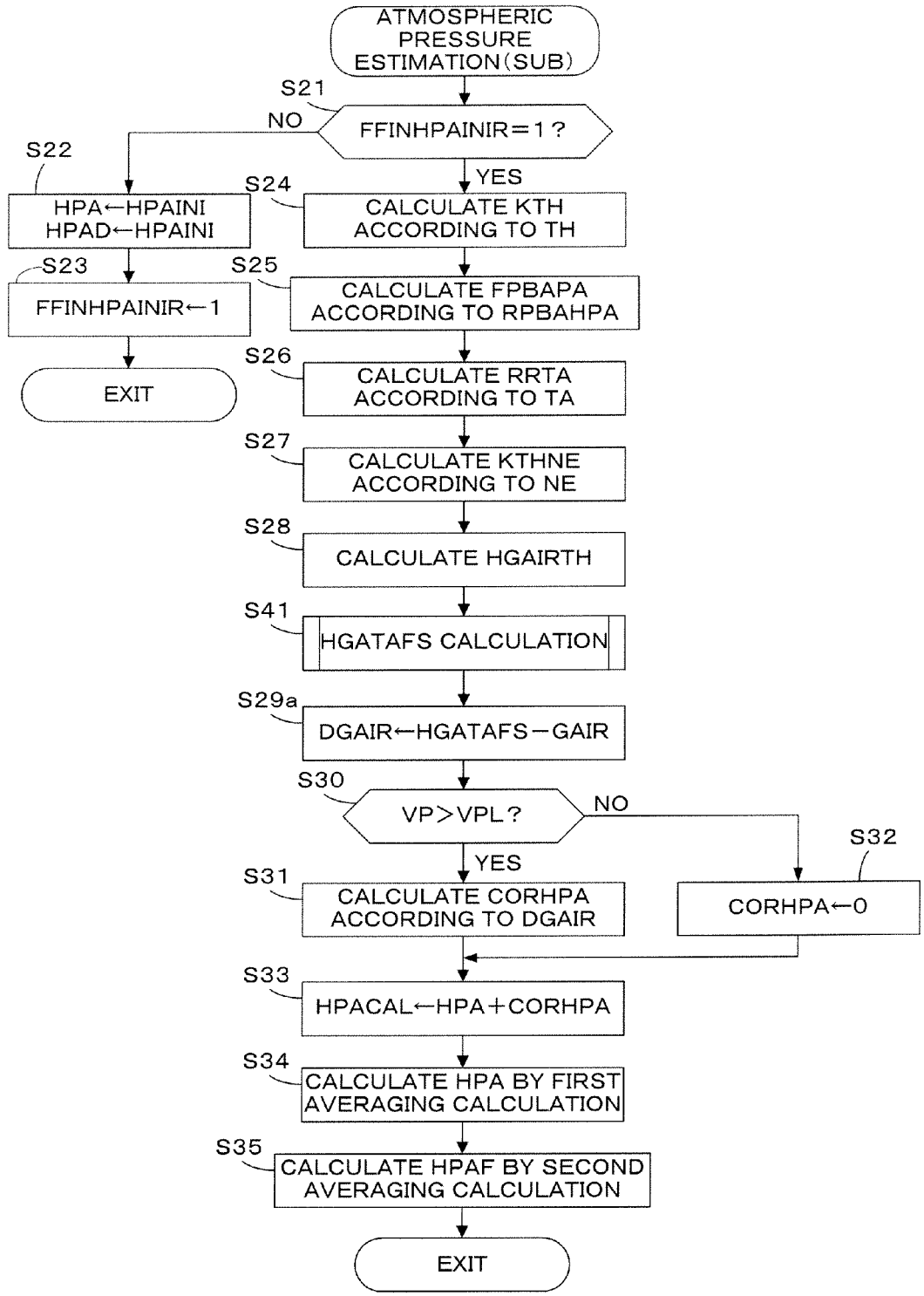
FIG. 11 is a flowchart of a subroutine of the atmospheric pressure estimation process (second embodiment).

FIG. 11 is a flowchart of the atmospheric pressure estimation process corresponding to the configuration of FIG. 10.

The process of FIG. 11 is obtained by replacing step S29 of FIG. 4 with step S29a and adding step S41.

Figure 12:
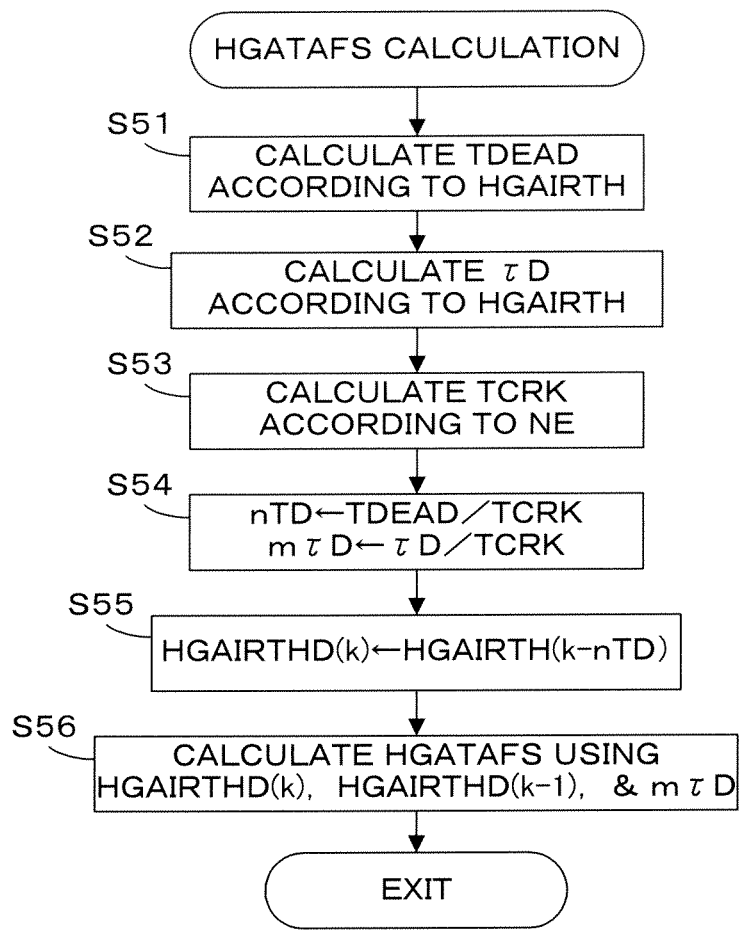
FIG. 12 is a flowchart of a process for calculating an AFS corrected estimated throttle valve passing air flow rate (HGATAFS).

In step S41, a HGATAFS calculation process shown in FIG. 12 is executed to calculate the AFS estimated throttle valve passing air flow rate HGATAFS. The process of FIG. 12 corresponds to the AFS correction block 56 of FIG. 10.

In step S29a, the intake air flow rate LAIR is subtracted from the AFS corrected estimated throttle valve passing air flow rate HGATAFS calculated in step S41, to calculate the flow rate deviation DGAIR.

Figure 13:
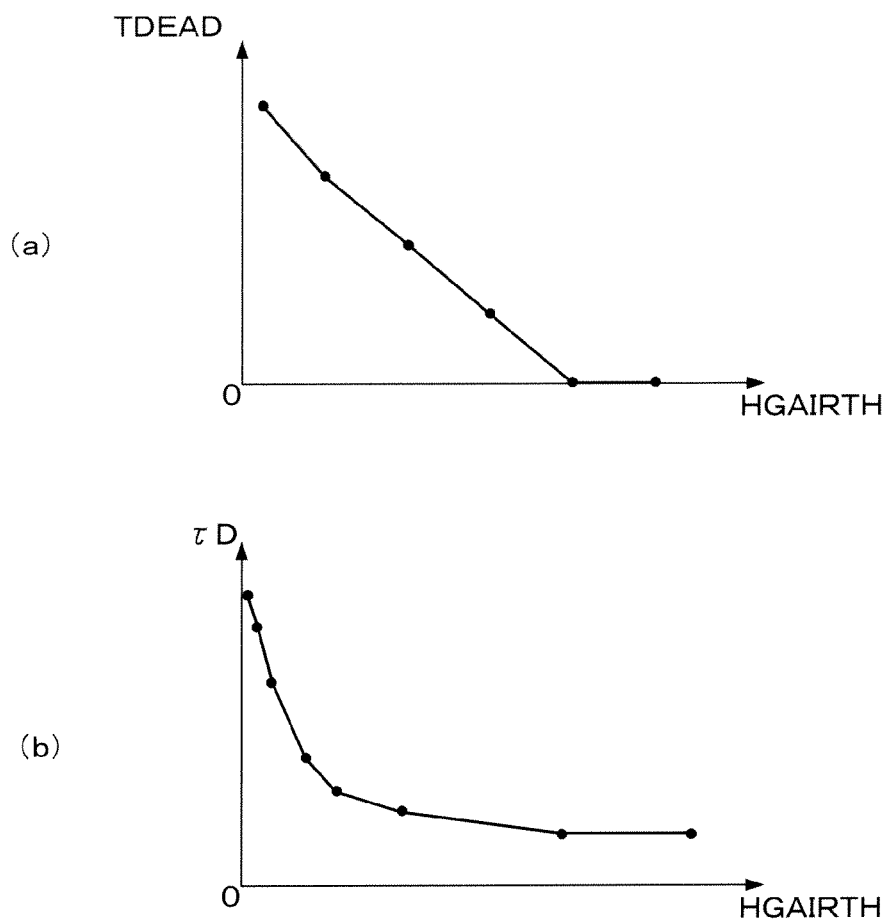
FIG. 13 shows tables referred to in the process of FIG. 12.

In step S51 of FIG. 12, a TDEAD table shown in FIG. 13(a) is retrieved according to the estimated throttle valve passing air flow rate HGAIRTH, to calculate a dead time period TDEAD in the flow rate detection of the intake air flow rate sensor 13. The TDEAD table is set so that the dead time period TDEAD decreases as the estimated throttle valve passing air flow rate HGAIRTH increases.

In step S52, a τD table shown in FIG. 13(b) is retrieved according to the estimated throttle valve passing air flow rate HGAIRTH, to calculate a delay time constant τD in the flow rate detection of the intake air flow rate sensor 13. The τD table is set so that the delay time constant τD decreases as the estimated throttle valve passing air flow rate HGAIRTH increases.

In step S53, a crank angle time period TCRK (sec) is calculated according to the engine rotational speed NE (rpm). In this embodiment, the crank angle time period TCRK is calculated by the following equation (21) since the calculation is performed in synchronism with the TDC pulse of the 4-cylinder engine.

$$TCRK = 30/NE \tag{21}$$

In step S54, a discrete dead time period nTD and a discrete delay time constant m τD are respectively calculated by the following equations (22) and (23).

$$nTD = TDEAD/TCRK \tag{22}$$

$$m\tau D = \tau D/TCRK \tag{23}$$

In step S55, a delayed estimated throttle valve passing air flow rate HGAIRTHD(k) is set to an estimated throttle valve passing air flow rate HGAIRTH(k−nTD) which is calculated and stored in the memory at the timing of the discrete dead time period nTD before.

In step S56, the delayed estimated throttle valve passing air flow rate HGAIRTHD(k) and the preceding value of the delayed estimated throttle valve passing air flow rate HGAIRTHD(k−1) are applied to the following equation (24), to calculate the AFS corrected estimated throttle valve passing air flow rate HGATAFS. The equation (24) is an equation which approximates the first-order delay system. The coefficients A1 and B1 in the equation (24) are respectively calculated by the following equations (25) and (26) to which the discrete delay time constant mτD is applied.

[Eq. 3]

$$HGATAFS = A1 \times HGAIRTHD(k) + \tag{24}$$
$$A1 \times HGAIRTHD(k-1) + B1 \times HGATAFS(k-1)$$

$$A1 = \frac{m\tau D}{2 + m\tau D} \tag{25}$$

$$B1 = \frac{2 - m\tau D}{2 + m\tau D} \tag{26}$$

According to the process of FIG. 12, the estimated throttle valve passing air flow rate HGAIRTH is corrected according to the detection delay characteristic of the intake air flow rate sensor 13, to calculate the AFS corrected estimated throttle valve passing air flow rate HGATAFS which indicates an estimated air flow rate at the detection timing of the detected intake air flow rate GAIR.

By using the AFS corrected estimated throttle valve passing air flow rate HGATAFS, it is possible to improve estimation accuracy of the atmospheric pressure especially in the low load operating condition where the intake air flow rate flow rate GAIR is comparatively low.

In this embodiment, the process of FIG. 12 corresponds to the flow rate detection delay correcting means.

Third Embodiment

Figure 14:
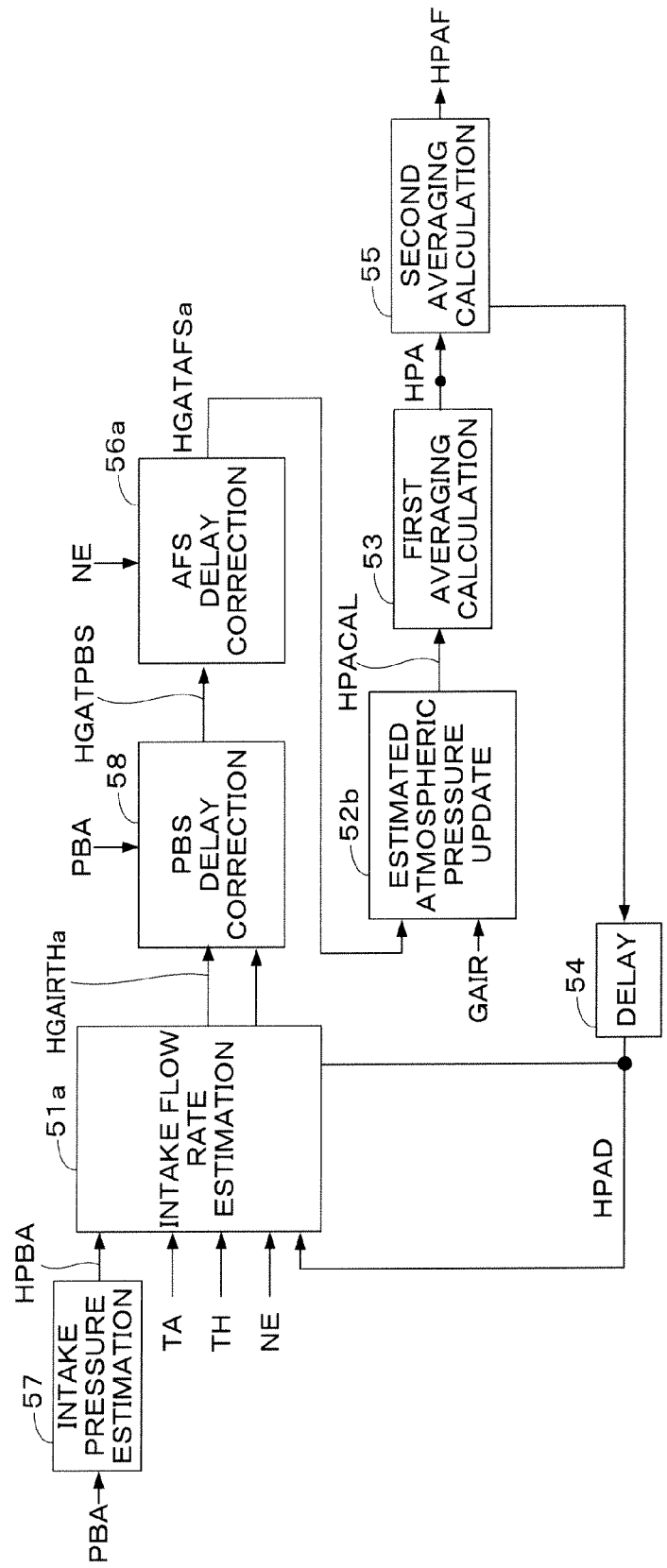
FIG. 14 is a block diagram showing a configuration of the atmospheric pressure estimation module (third embodiment).

FIG. 14 is a block diagram showing a configuration of the atmospheric pressure estimation module according to a third embodiment of the present invention. The atmospheric pressure estimation module shown in FIG. 14 is obtained by adding an intake pressure estimation block 57 and a PBS delay correction block 58 to the atmospheric pressure estimation module of FIG. 10, and replacing the intake air flow rate estimation block 51, the AFS delay correction block 56, and the estimated atmospheric pressure update block 52a respectively with an intake air flow rate estimation block 51a, an AFS delay correction block 56a, and an estimated atmospheric pressure update block 52b. This embodiment is the same as the second embodiment except for this point.

The intake pressure estimation block 57 calculates an estimated intake pressure HPBA by the following equation (31).

$$HPBA = PBA(k) + (PBA(k) - PBA(k-1)) \quad (31)$$

The intake air flow rate estimation block 51a calculates an estimated throttle valve passing air flow rate HGAIRTHa using the estimated intake pressure HPBA instead of the intake pressure PBA.

The PBS delay correction block 58 corrects the estimated throttle valve passing air flow rate HGAIRTHa according to a detection delay characteristic of the intake pressure sensor 8, to calculate a PBS corrected estimated throttle valve passing air flow rate HGATPBS.

The AFS delay correction block 56a corrects the PBS corrected estimated throttle valve passing air flow rate HGATPBS to calculate an AFS corrected estimated throttle valve passing air flow rate HGATAFSa. The estimated atmospheric pressure update block 52h calculates the updated estimated atmospheric pressure HPACAL so that the AFS corrected estimated throttle valve passing air flow rate HGATAFSa coincides with the intake air flow rate GAIR.

Figure 15:
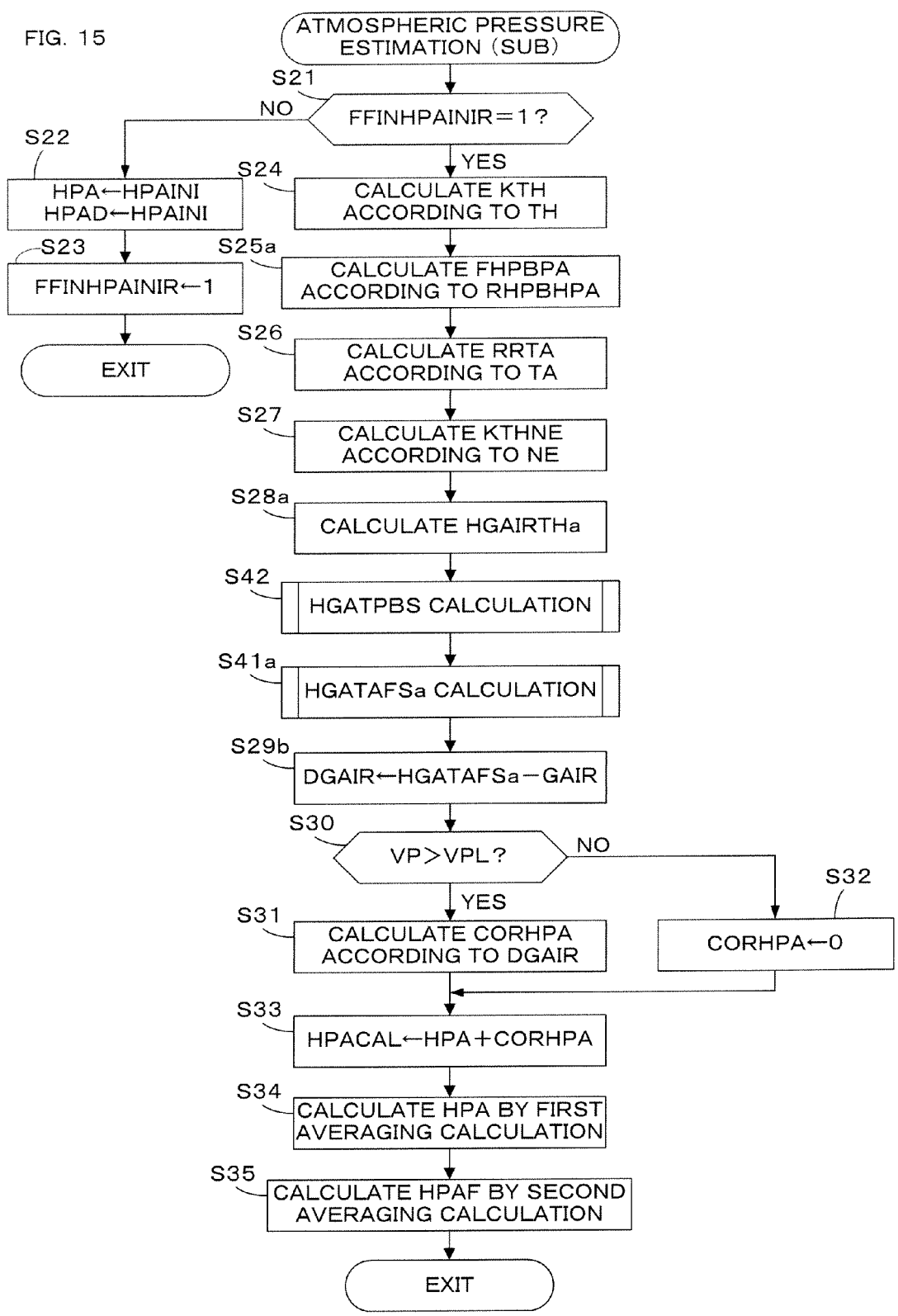
FIG. 15 is a flowchart of a subroutine of the atmospheric pressure estimation process (third embodiment).

FIG. 15 is a flowchart of the atmospheric pressure estimation process corresponding to the configuration of FIG. 14. The process of FIG. 15 is obtained by replacing steps S25, S28, S41, and S29a in the process of FIG. 11 respectively with steps S25a, 28a, S41a, and S29b, and adding step S42.

In step S25a, the pressure ratio RHPBHPA is calculated by the following equation (32), and the pressure ratio flow rate function table shown in FIG. 5(b) is retrieved according to the pressure ratio RHPBHPA, to calculate a pressure ratio flow rate function value FHPBPA.

$$RHPBHPA = HPBA/HPAD \quad (32)$$

In step S28a, the opening area flow rate function value KTH, the pressure ratio flow rate function value FHPBPA, the intake air temperature parameter RRTA, the delayed estimated atmospheric pressure HPAD, and the rotational speed correction coefficient KTHNE are applied to the following equation (1b), to calculate the estimated throttle valve passing air flow rate HGAIRTHa.

$$HGAIRTHa = KC \times HPAD \times KTH \times FHPBPA \times KTHNE/RRTA \quad (1b)$$

Figure 16:
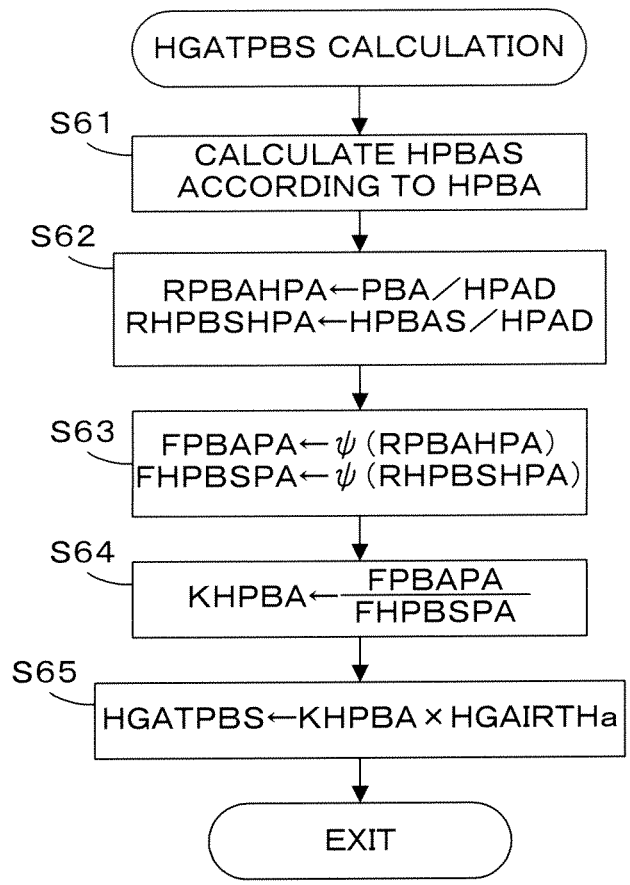
FIG. 16 is a flowchart of a process for calculating a PBS corrected estimated throttle valve passing air flow rate (HGATPBS).

In step S42, a HGATPBS calculation process shown in FIG. 16 is executed to calculate the PBS corrected estimated throttle valve passing air flow rate HGATPBS. The process of FIG. 16 corresponds to the PBS delay correction block 58 shown in FIG. 14.

In step S41a, the AFS estimated throttle valve passing air flow rate HGATAFSa is calculated using the PBS corrected estimated throttle valve passing air flow rate HGATPBS instead of the estimated throttle valve passing air flow rate HGAIRTH.

In step S29b, the intake air flow rate GAIR is subtracted from the AFS corrected estimated throttle valve passing air flow rate HGATAFSa calculated in step S41a, to calculate the flow rate deviation DGAIR.

In step S61 of FIG. 16, a delayed estimated intake pressure HPBAS is calculated by the following equation (33). The equation (33) is an equation which approximates the intake pressure sensor 8 with the first-order delay system model. The coefficients A2 and B2 in the equation (33) are respectively calculated by the following equations (34) and (35). The averaging coefficient C2 in the equations (34) and (35) is empirically set.

$$HPBAS = A2 \times HPBA(k) + A2 \times HPBA(k-1) + B2 \times HPBAS(k-1) \quad (33)$$

$$A2 = C2/(2+C2) \quad (34)$$

$$B2 = (2-C2)/(2+C2) \quad (35)$$

In step S62, the detected intake pressure PBA is applied to the following equation (36) to calculate a pressure ratio RPBAHPA. The delayed estimated intake pressure HPBAS is applied the following equation (37) to calculate a pressure ratio RHPBSHPA.

$$RPBAHPA = PBA/HPAD \quad (36)$$

$$RHPBSHPA = HPBAS/HPAD \quad (37)$$

In step S63, the pressure flow rate function table shown in FIG. 5(b) is retrieved according to the pressure ratios RPBAHPA and RHPBSHPA, to calculate the pressure ratio flow rate function values FPBAPA and FHPBSPA. In step S64, the pressure ratio flow rate function values FPBAPA and FHPBSPA are applied to the following equation (38), to calculate a PBS delay correction coefficient KHPBA.

$$KHPBA = FPBAPA/FHPBSPA \quad (38)$$

In step S65, the PBS delay correction coefficient KHPBA and the estimated throttle valve passing air flow rate HGAIRTHa are applied to the following equation (39) to calculate the PBS corrected estimated throttle valve passing air flow rate HGATPBS.

$$HGATPBS = KHPBA \times HGAIRTHa \quad (39)$$

According to the process of FIG. 16, the estimated throttle valve passing air flow rate HGAIRTHa is corrected according to the detection delay characteristic (the first-order delay characteristic) of the intake pressure sensor 8, to calculate the PBS corrected estimated throttle valve passing air flow rate HGATPBS.

By updating the estimated atmospheric pressure HPA using the PBS corrected estimated throttle valve passing air flow rate HGATPBS, it is possible to further improve estimation accuracy of the estimated atmospheric pressure HPA.

In this embodiment, the process of FIG. 16 corresponds to the pressure detection delay correcting means. Step S41a in FIG. 15 corresponds to the flow, rate detection delay correcting means.

Fourth Embodiment

Figure 17:
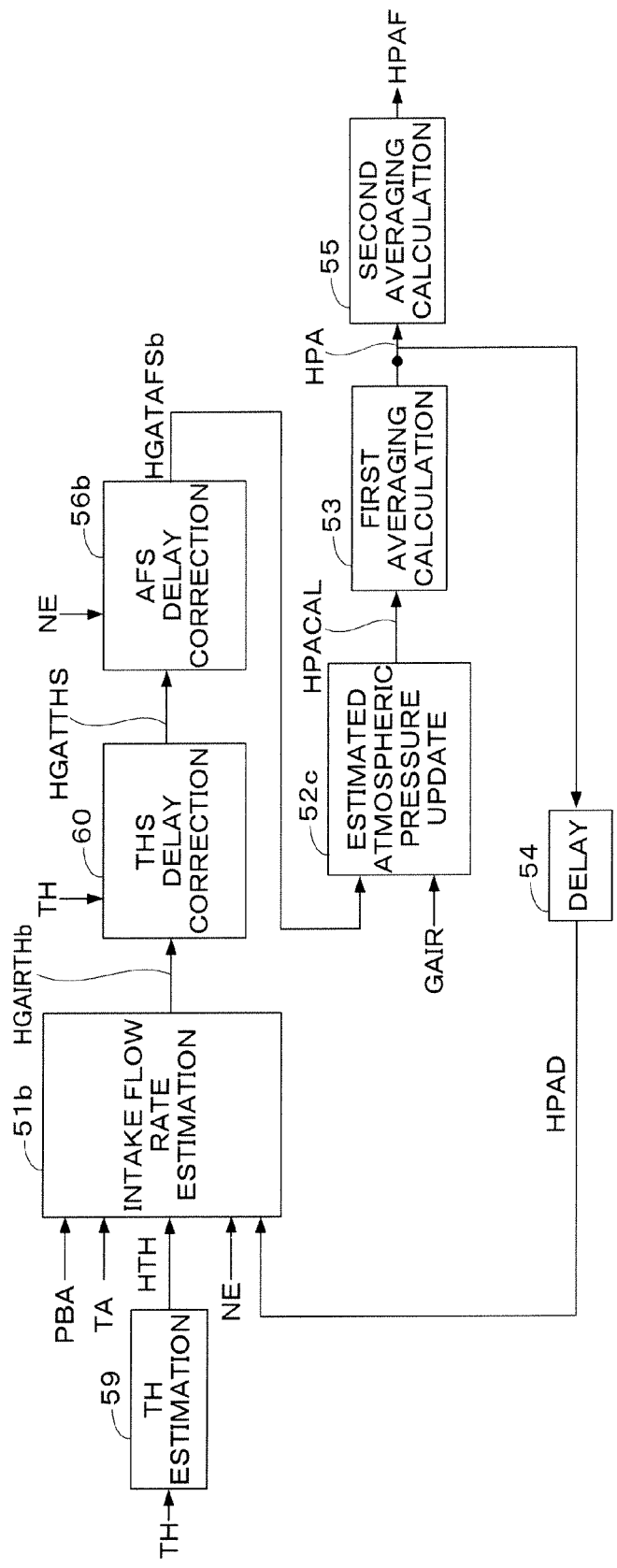
FIG. 17 is a block diagram showing a configuration of the atmospheric pressure estimation module (fourth embodiment).

FIG. 17 is a block diagram showing a configuration of the atmospheric pressure estimation module according to a fourth embodiment of the present invention. The atmospheric pressure estimation module shown in FIG. 17 is obtained by adding a TH estimation block 59 and a THS delay correction block 60 to the atmospheric pressure estimation module of FIG. 10, and replacing the intake air flow rate estimation block 51, the AFS delay correction block 56, and the estimated atmospheric pressure update block 52a respectively with an intake air flow rate estimation block 51b, an AFS delay correction block 56b, and an estimated atmospheric pressure update block 52c. This embodiment is the same as the second embodiment except for this point.

The TH estimation block 59 calculates an estimated throttle valve opening HTH by the following equation (41).

$$HTH = TH(k) + (TH(k) - TH(k-1)) \quad (41)$$

The intake air flow rate estimation block 51b calculates an estimated throttle valve passing air flow rate HGAIRTHb using the estimated throttle valve opening HTH instead of the throttle valve opening TH.

The THS delay correction block 60 corrects the estimated throttle valve passing air flow rate HGAIRTHb according to a detection delay characteristic of the throttle valve opening sensor 4, to calculate a THS corrected estimated throttle valve passing air flow rate HGATTHS.

The AFS delay correction block 56b corrects the THS corrected estimated throttle valve passing air flow rate HGATTHS to calculate an AFS corrected estimated throttle valve passing air flow rate HGATAFSb. The estimated atmospheric pressure update block 52c calculates the updated estimated atmospheric pressure HPACAL so that the AFS corrected estimated throttle valve passing air flow rate HGATAFSb coincides with the intake air flow rate GAIR.

Figure 18:
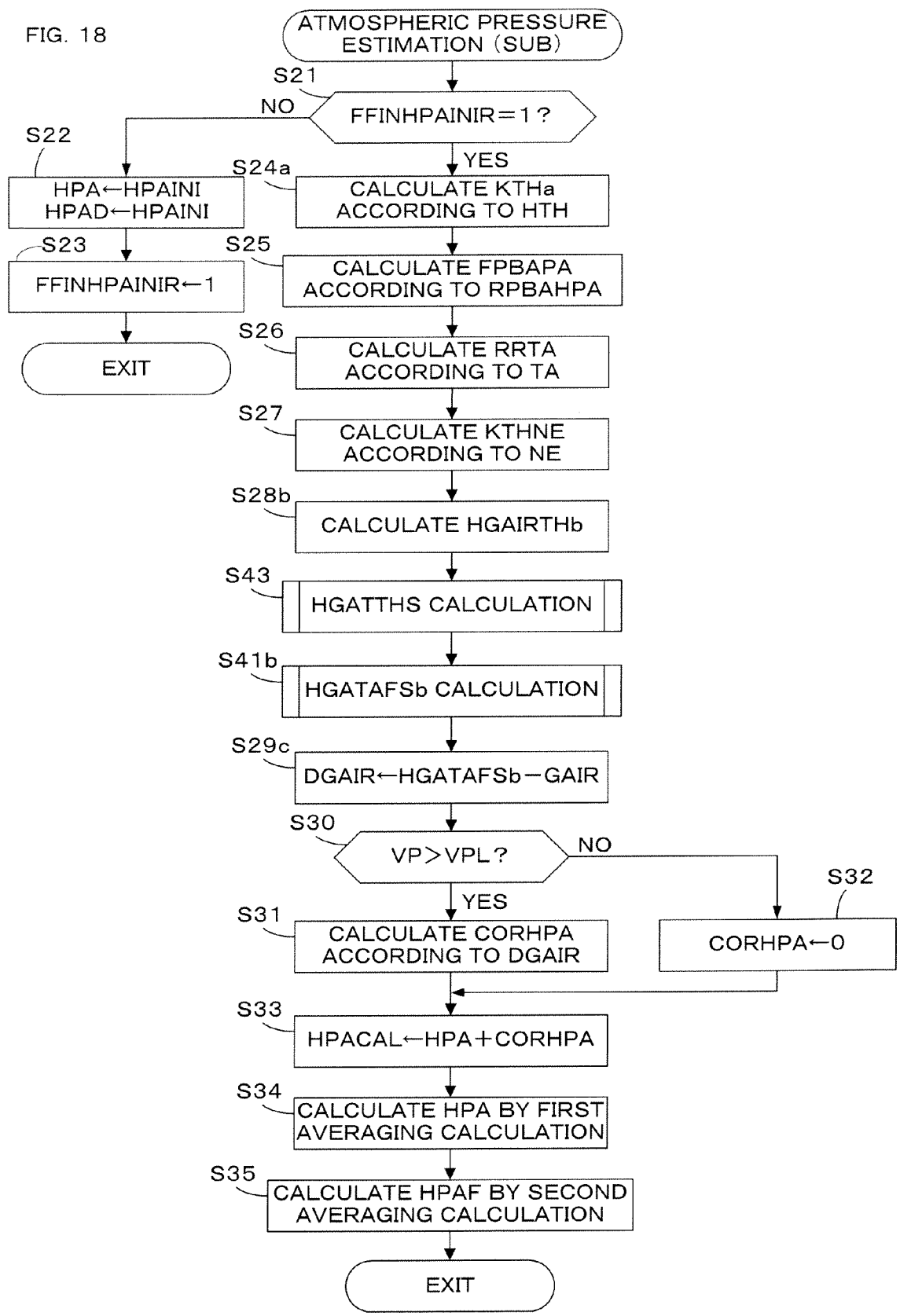
FIG. 18 is a flowchart of a subroutine of the atmospheric pressure estimation process (fourth embodiment).

FIG. 18 is a flowchart of the atmospheric pressure estimation process corresponding to the configuration of FIG. 17. The process of FIG. 18 is obtained by replacing steps S24, S28, S41, and S29a in the process of FIG. 11 respectively with steps S24a, 28b, S41b, and S29c, and adding step S43.

In step S24a, the KTH table shown in FIG. 5(a) is retrieved according to the estimated throttle valve opening HTH to calculate the opening area flow rate function value KTHa.

In step S28b, the opening area flow rate function value KTHa, the pressure ratio flow rate function value FHPBPA, the intake air temperature parameter RRTA, the delayed estimated atmospheric pressure HPAD, and the rotational speed correction coefficient KTHNE are applied to the following equation (1e), to calculate the estimated throttle valve passing air flow rate HGAIRTHb.

$$HGAIRTHb = KC \times HPAD \times KTHa \times FHPBPA \times KTHNE/RRTA \quad (1e)$$

Figure 19:
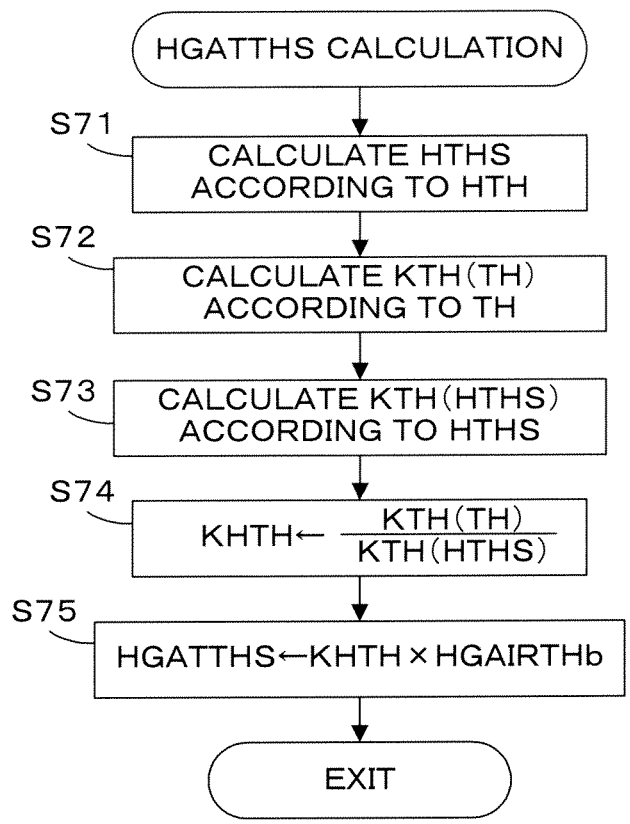
FIG. 19 is a flowchart of a process for calculating a THS corrected estimated throttle valve passing air flow rate (HGATTHS).

In step S43, an HGATTHS calculation process shown in FIG. 19 is executed to calculate the THS corrected estimated throttle valve passing air flow rate HGATTHS. The process of FIG. 19 corresponds to the THS delay correction block 60 of FIG. 17.

In step S41b, the AFS estimated throttle valve passing air flow rate HGATAFSb is calculated using the THS corrected estimated throttle valve passing air flow rate HGATTHS instead of the estimated throttle valve passing air flow rate HGAIRTH.

In step S29c, the intake air flow rate GAIR is subtracted from the AFS corrected estimated throttle valve passing air flow rate HGATAFSb calculated in step S41b, to calculate the flow rate deviation DGAIR.

In step S71 of FIG. 19, a delayed estimated throttle valve opening HTHS is calculated by the following equation (43). The equation (43) is an equation which approximates the throttle valve opening sensor 4 with the first-order delay system model. The coefficients A3 and B3 in the equation (43) are respectively calculated by the following equations (44) and (45). The averaging coefficient C3 in the equations (44) and (45) is empirically set.

$$HTHS = A3 \times HTH(k) + A3 \times HTH(k-1) + B3 \times HTHS(k-1) \quad (43)$$

$$A3 = C3/(2+C3) \quad (44)$$

$$B3 = (2-C3)/(2+C3) \quad (45)$$

In step S72, the KTH table shown in FIG. 5(a) is retrieved according to the throttle valve opening TH to calculate an opening area flow rate function value KTH(TH). In step S73, the KTH table shown in FIG. 5(a) is retrieved according to the delayed estimated throttle valve opening HTHS to calculate an opening area flow rate function value KTH(HTHS).

In step S74, the opening area flow rate function values KTH(TH) and KTH(HTHS) are applied to the following equation (46) to calculate a THS delay correction coefficient KHTH.

$$KHTH = KTH(TH)/KTH(HTHS) \quad (46)$$

In step S75, the THS delay correction coefficient KHTH and the estimated throttle valve passing air flow rate HGAIRTHb are applied to the following equation (47), to calculate the THS corrected estimated throttle valve passing air flow rate HGATTHS.

$$HGATTHS = KHTH \times HGAIRTHb \quad (47)$$

According to the process of FIG. 19, the estimated throttle valve passing air flow rate HGAIRTHb is corrected according to the detection delay characteristic (the first-order delay characteristic) of the throttle valve opening sensor 4, to calculate the THS corrected estimated throttle valve passing air flow rate HGATTHS.

By updating the estimated atmospheric pressure HPA using the THS corrected estimated throttle valve passing air flow rate HGATTHS, it is possible to further improve estimation accuracy of the estimated atmospheric pressure HPA.

In this embodiment, the process of FIG. 19 corresponds to the opening detection delay correcting means. Step S41b in FIG. 18 corresponds to the flow rate detection delay correcting means.

[Other Modifications]

In the embodiments described above, the present invention is applied to the engine having a throttle valve. The present invention is applicable also to the engine which has no throttle valve and controls the intake air flow rate by continuously changing the lift amount and/or the opening angle of the intake valve. In this modification, a cylinder pressure sensor is provided, and the detected cylinder pressure is used instead of the detected intake pressure. In this modification, the intake valve corresponds to the intake air control valve.

Further, the present invention can be applied also to a water craft propulsion engine such as an outboard engine having a vertically extending crankshaft.

DESCRIPTION OF REFERENCE NUMERALS

1 Internal combustion engine
3 Throttle valve (intake air control valve)
4 Throttle valve opening sensor (control valve opening detecting means)
5 Electronic control unit (atmospheric pressure estimating means, flow rate estimating, updating means, first averaging calculation means, second averaging calculation means, flow rate detection delay correcting means, pressure detection delay correcting means, opening detection delay correcting means)
8 Intake pressure sensor (intake pressure detecting means)
13 Intake air flow rate sensor (intake air control valve passing air flow rate detecting means)
32 Vehicle speed sensor (vehicle speed detecting means)

The invention claimed is:

1. An atmospheric pressure estimating apparatus having atmospheric pressure estimating means for estimating a first atmospheric pressure applied to a calculation of control parameters of an internal combustion engine, said atmospheric pressure estimating apparatus being characterized by comprising:
intake pressure detecting means for detecting an intake pressure of said engine;
intake air control valve passing air flow rate detecting means for detecting a flow rate of air passing through an intake air control valve of said engine; and
control valve opening detecting means for detecting an opening of the intake air control valve,
wherein said atmospheric pressure estimating means includes:
flow rate estimating means for calculating an estimated intake air control valve passing air flow rate based on a second atmospheric pressure for flow rate estimation, the intake pressure, and the intake air control valve opening;
updating means for updating a third atmospheric pressure for estimating calculation so that the estimated intake air control valve passing air flow rate coincides with the detected intake air control valve passing air flow rate;
first averaging calculation means for calculating a first averaged estimated atmospheric pressure by averaging the third atmospheric pressure updated by said updating means; and
second averaging calculation means for calculating a second averaged estimated atmospheric pressure by averaging the first averaged estimated atmospheric pressure,
wherein said flow rate estimating means calculates the estimated intake air control valve passing air flow rate using the first averaged estimated atmospheric pressure as the second atmospheric pressure, and
said atmospheric pressure estimating means calculates the second averaged estimated atmospheric pressure as the first atmospheric pressure.

2. An atmospheric pressure estimating apparatus according to claim 1, wherein said atmospheric pressure estimating means applies an intake pressure detected during a period from the time of the last stoppage of said engine to the time of completion of the cranking of said engine, as an initial value of the second atmospheric pressure.

3. An atmospheric pressure estimating apparatus according to claim 1, wherein said atmospheric pressure estimating means sets the third atmospheric pressure to the intake pressure when the intake pressure is higher than the third atmospheric pressure.

4. An atmospheric pressure estimating apparatus according to any one of claim 1, further comprising vehicle speed detecting means for detecting a running speed of the vehicle driven by said engine,
wherein said updating means stops updating the third atmospheric pressure when the vehicle speed is equal to or lower than a predetermined vehicle speed.

5. An atmospheric pressure estimating apparatus according to claim 1, further comprising vehicle speed detecting means for detecting a running speed of the vehicle driven by said engine,
wherein said updating means reduces an updating speed of the third atmospheric pressure when the vehicle speed is equal to or lower than a predetermined vehicle speed.

6. An atmospheric pressure estimating apparatus according to claim 1, wherein said atmospheric pressure estimating means further includes flow rate detection delay correcting means for calculating a corrected estimated intake air control valve passing air flow rate by correcting the estimated intake air control valve passing air flow rate according to a detection delay characteristic of said intake air control valve passing air flow rate detecting means,
wherein said updating means updates the third atmospheric pressure so that the corrected estimated intake air control valve passing air flow rate coincides with the detected intake air control valve passing air flow rate.

7. An atmospheric pressure estimating apparatus according to claim 1, wherein said atmospheric pressure estimating means further includes:
pressure detection delay correcting means for calculating a first corrected estimated intake air control valve passing air flow rate by correcting the estimated intake air control valve passing air flow rate according to a detection delay characteristic of said intake pressure detecting means; and
flow rate detection delay correcting means for calculating a second corrected estimated intake air control valve passing air flow rate by correcting the first corrected estimated intake air control valve passing air flow rate according to a detection delay characteristic of said intake air control valve passing air flow rate detecting means,
wherein said flow rate estimating means calculates the estimated intake air control valve passing air flow rate using an estimated value of the intake pressure, and
said updating means updates the third atmospheric pressure so that the second corrected estimated intake air control valve passing air flow rate coincides with the detected intake air control valve passing air flow rate.

8. An atmospheric pressure estimating apparatus according to claim 1, wherein said atmospheric pressure estimating means further includes:
opening detection delay correcting means for calculating a first corrected estimated intake air control valve passing air flow rate by correcting the estimated intake air control valve passing air flow rate according to a detection delay characteristic of said intake air control valve opening detecting means; and
flow rate detection delay correcting means for calculating a second corrected estimated intake air control valve passing air flow rate by correcting the first corrected estimated intake air control valve passing air flow rate according to a detection delay characteristic of said intake air control valve passing air flow rate detecting means, wherein said flow rate estimating means calculates the estimated intake air control valve passing air flow rate using an estimated value of the intake air control valve opening, and said updating means updates the third atmospheric pressure so that the second corrected estimated intake air control valve passing air flow rate coincides with the detected intake air control valve passing air flow rate.

9. An atmospheric pressure estimating method for estimating a first atmospheric pressure applied to a calculation of control parameters of an internal combustion engine, said atmospheric pressure estimating method being characterized by comprising the steps of:
  a) detecting an intake pressure of said engine by an intake pressure sensor;
  b) detecting a flow rate of air passing through an intake air control valve of said engine by an air flow rate sensor; and
  c) detecting an opening of the intake air control valve by a control valve opening sensor,
  d) calculating an estimated intake air control valve passing air flow rate based on a second atmospheric pressure for flow rate estimation, the detected intake pressure, and the detected intake air control valve opening;
  e) updating a third atmospheric pressure for estimating calculation so that the estimated intake air control valve passing air flow rate coincides with the detected intake air control valve passing air flow rate;
  f) calculating a first averaged estimated atmospheric pressure by averaging the third atmospheric pressure; and
  g) calculating a second averaged estimated atmospheric pressure by averaging the first averaged estimated atmospheric pressure, wherein the estimated intake air control valve passing air flow rate is calculated in said step d) using the first averaged estimated atmospheric pressure as the second atmospheric pressure, and said steps d) to f) are repeatedly executed, wherein the second averaged estimated atmospheric pressure is calculated as the first atmospheric pressure.

10. An atmospheric pressure estimating method according to claim 9, wherein the intake pressure detected during a period from the time of the last stoppage of said engine to the time of completion of the cranking of said engine is applied as an initial value of the second atmospheric pressure.

11. An atmospheric pressure estimating method according to claim 9, wherein the third atmospheric pressure is set to the intake pressure when the intake pressure is higher than the third atmospheric pressure.

12. An atmospheric pressure estimating method according to claim 9, further including the step of
  h) detecting a running speed of the vehicle driven by said engine,
  wherein the update of the third atmospheric pressure is stopped when the vehicle speed is equal to or lower than a predetermined vehicle speed.

13. An atmospheric pressure estimating method according to claim 9, further including the step of
  h) detecting a running speed of the vehicle driven by said engine,
  wherein an updating speed of the third atmospheric pressure is reduced when the vehicle speed is equal to or lower than a predetermined vehicle speed.

14. An atmospheric pressure estimating method according to claim 9, wherein said step d) includes the step of
  i) calculating a corrected estimated intake air control valve passing air flow rate by correcting the estimated intake air control valve passing air flow rate according to a detection delay characteristic of said air flow rate sensor,
  wherein the third atmospheric pressure is updated in said step e) so that the corrected estimated intake air control valve passing air flow rate coincides with the detected intake air control valve passing air flow rate.

15. An atmospheric pressure estimating method according to claim 9, wherein said step d) includes the steps of:
  j) calculating a first corrected estimated intake air control valve passing air flow rate by correcting the estimated intake air control valve passing air flow rate according to a detection delay characteristic of said intake pressure sensor; and
  k) calculating a second corrected estimated intake air control valve passing air flow rate by correcting the first corrected estimated intake air control valve passing air flow rate according to a detection delay characteristic of said air flow rate sensor,
  wherein the estimated intake air control valve passing air flow rate is calculated in said step d) using an estimated value of the intake pressure, and
  the third atmospheric pressure is updated in said step e) so that the second corrected estimated intake air control valve passing air flow rate coincides with the detected intake air control valve passing air flow rate.

16. An atmospheric pressure estimating method according to claim 9, wherein said step d) includes the steps of:
  l) calculating a first corrected estimated intake air control valve passing air flow rate by correcting the estimated intake air control valve passing air flow rate according to a detection delay characteristic of said control valve opening sensor; and
  m) calculating a second corrected estimated intake air control valve passing air flow rate by correcting the first corrected estimated intake air control valve passing air flow rate according to a detection delay characteristic of said air flow rate sensor,
  wherein the estimated intake air control valve passing air flow rate is calculated in said step d) using an estimated value of the intake air control valve opening, and
  the third atmospheric pressure is updated in said step e) so that the second corrected estimated intake air control valve passing air flow rate coincides with the detected intake air control valve passing air flow rate.

* * * * *